US 12,101,444 B2

(12) United States Patent
Maruoka

(10) Patent No.: US 12,101,444 B2
(45) Date of Patent: Sep. 24, 2024

(54) LIQUID DISCHARGE APPARATUS, LIQUID DISCHARGE METHOD, AND STORAGE MEDIUM

(71) Applicant: Kenji Maruoka, Kanagawa (JP)

(72) Inventor: Kenji Maruoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 373 days.

(21) Appl. No.: 17/456,457

(22) Filed: Nov. 24, 2021

(65) Prior Publication Data
US 2022/0174159 A1  Jun. 2, 2022

(30) Foreign Application Priority Data

Nov. 27, 2020  (JP) .................................. 2020-197640

(51) Int. Cl.
H04N 1/00 (2006.01)
B41J 2/01 (2006.01)
B41J 2/175 (2006.01)
B41J 2/21 (2006.01)
G06F 3/12 (2006.01)
G06K 15/02 (2006.01)

(52) U.S. Cl.
CPC .......... H04N 1/00005 (2013.01); B41J 2/175 (2013.01); B41J 2/21 (2013.01); B41J 2/2135 (2013.01); H04N 1/00034 (2013.01); H04N 1/0066 (2013.01)

(58) Field of Classification Search
None
See application file for complete search history.

(56) References Cited

U.S. PATENT DOCUMENTS

| 2011/0063352 | A1* | 3/2011 | Sakurada | B41J 19/142 347/14 |
| 2018/0022088 | A1* | 1/2018 | Bando | B41J 11/0095 347/14 |
| 2018/0147835 | A1* | 5/2018 | Nakamura | B41J 2/2135 |
| 2018/0270366 | A1 | 9/2018 | Sunaoshi et al. | |
| 2018/0288259 | A1* | 10/2018 | Mizuno | H04N 1/00809 |
| 2021/0070070 | A1* | 3/2021 | Hasegawa | B41J 11/42 |

FOREIGN PATENT DOCUMENTS

| JP | 2005035083 | * | 2/2005 | ............... B41J 3/04 |
| JP | 2006159602 | * | 6/2006 | ............... B41J 2/01 |
| JP | 2011126091 | * | 6/2011 | ............... B41J 2/01 |

(Continued)

Primary Examiner — Beniyam Menberu
(74) Attorney, Agent, or Firm — IPUSA, PLLC

(57) ABSTRACT

A liquid discharge apparatus includes a first detection unit to detect a first movement amount of a recording medium. The apparatus includes a first liquid discharge unit, a first image capturing unit to capture a first image of the medium in a capturing range between the first detection unit and the first liquid discharge unit, a second image capturing unit to capture a second image of the medium in the capturing range between the first discharge unit and the first capturing unit, a second detection unit to detect a second movement amount of the medium based on the first and second images, a first determining unit to determine a discharge timing of the first discharge unit based on the first and second movement amounts, and a second determining unit to determine a capturing timing of the second capturing unit based on the first and second movement amounts.

17 Claims, 14 Drawing Sheets

(56) References Cited

FOREIGN PATENT DOCUMENTS

| JP | 2012016894 | * | 1/2012 | ................ B41J 2/01 |
| JP | 2016150539 | * | 8/2016 | ................ B41J 2/01 |
| JP | 2018097205 | * | 6/2018 | .............. B41J 2/525 |
| JP | 2018-154127 |  | 10/2018 | |
| JP | 2018158573 | * | 10/2018 | .............. B41J 15/06 |
| JP | 2021146614 | * | 9/2021 | .............. B41J 11/42 |

* cited by examiner

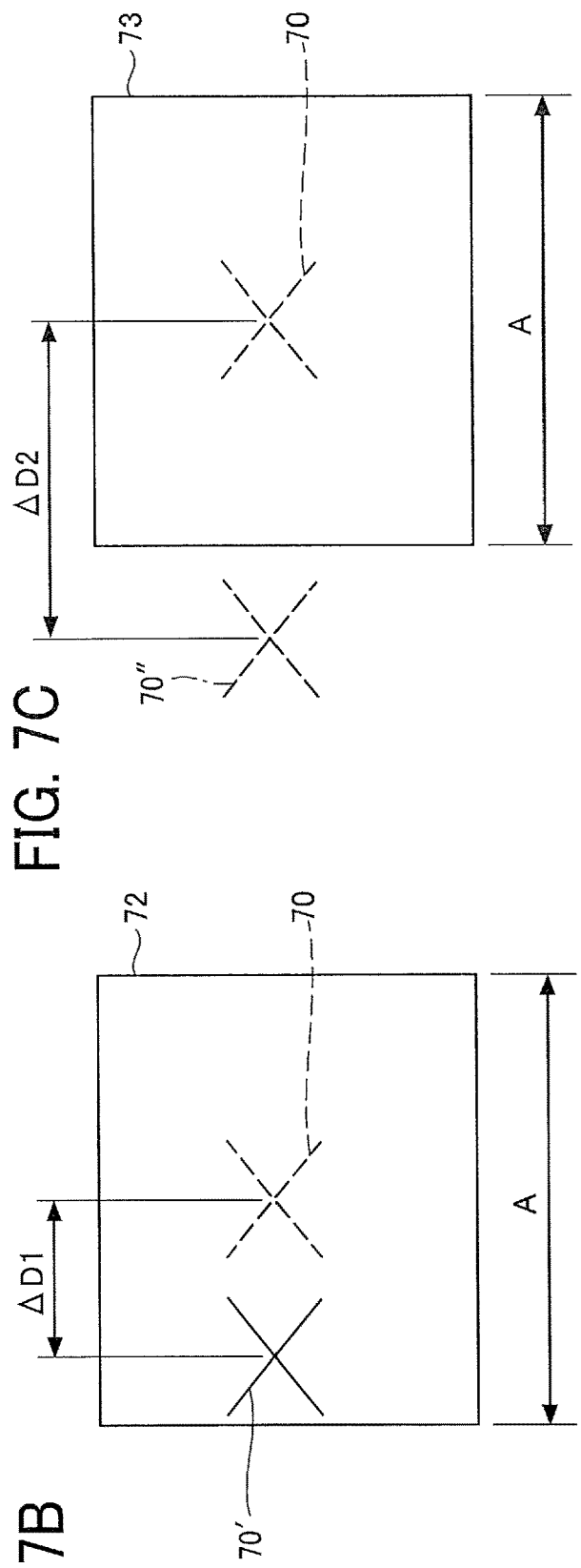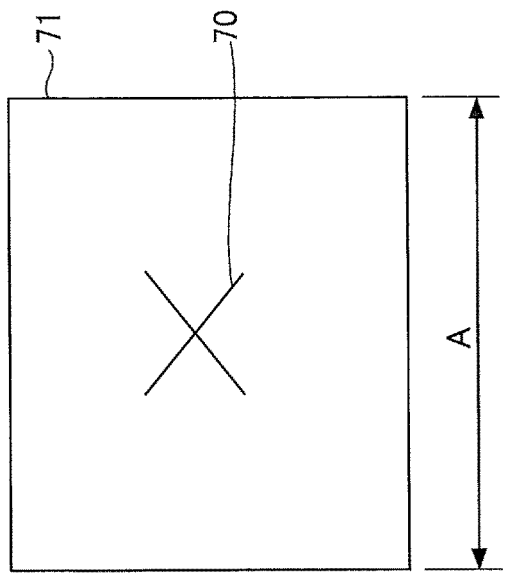

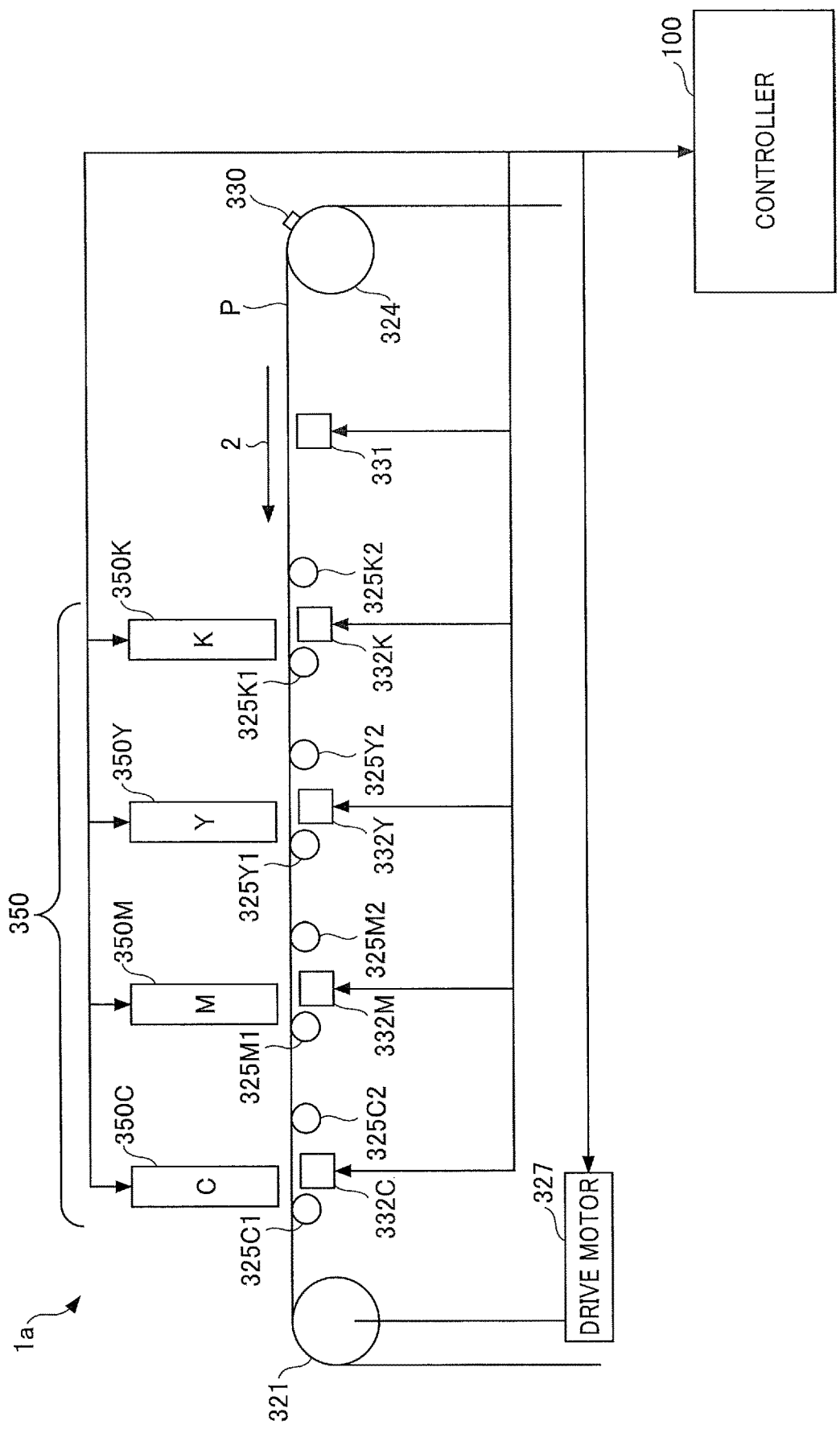

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2020-197640, filed on Nov. 27, 2020, in the Japan Patent Office, the entire disclosure of which is incorporated by reference herein.

BACKGROUND

Technical Field

Embodiments of the present disclosure relate to a liquid discharge apparatus, a liquid discharge method, and a storage medium storing program code.

Related Art

A liquid discharge apparatus has been known in which a liquid discharge unit discharges liquid to form an image on a recording medium.

In addition, a configuration is known in which a predetermined range of a recording medium is captured by an image capturing unit, and the discharge timing of a liquid discharge unit is determined according to a movement amount error of the recording medium detected from a captured image of the predetermined range.

SUMMARY

According to an embodiment of the present disclosure, there is provided a liquid discharge apparatus discharges liquid onto a recording medium moved in a moving direction. The liquid discharge apparatus includes: a first detection unit to detect a first movement amount of the recording medium; a first liquid discharge unit to discharge liquid onto the recording medium in an area downstream from the first detection unit in the moving direction; a first image capturing unit to capture a first image of the recording medium in an image capturing range in an area between the first detection unit and the first liquid discharge unit; a second image capturing unit to capture a second image of the recording medium in the image capturing range in an area between the first liquid discharge unit and the first image capturing unit; a second detection unit to detect a second movement amount of the recording medium based on the first image and the second image; a first determining unit to determine a discharge timing of the first liquid discharge unit based on the first movement amount and the second movement amount; and a second determining unit to determine an image capturing timing of the second image capturing unit based on the first movement amount and the second movement amount.

According to another embodiment of the present disclosure, there is provided a liquid discharge method to be executed by a liquid discharge apparatus that discharges liquid onto a recording medium moved in a moving direction. The liquid discharge method includes: detecting, by a first detection unit, a first movement amount of the recording medium; discharging liquid onto the recording medium by a first liquid discharge unit downstream from the first detection unit in the moving direction; capturing a first image of the recording medium in an image capturing range by a first image capturing unit between the first detection unit and the first liquid discharge unit; capturing a second image of the recording medium in the image capturing range by a second image capturing unit between the first liquid discharge unit and the first image capturing unit; detecting a second movement amount of the recording medium based on the first image and the second image; determining a discharge timing of the first liquid discharge unit based on the first movement amount and the second movement amount; and determining an image capturing timing of the second image capturing unit based on the first movement amount and the second movement amount.

According to still another embodiment of the present disclosure, there is provided a non-transitory computer-readable storage medium storing program code that, when executed by a computer, causes the computer to perform a process in a liquid discharge apparatus that discharges liquid onto a recording medium moved in a moving direction. The process includes: detecting, by a first detection unit, a first movement amount of the recording medium; discharging liquid onto the recording medium by a first liquid discharge unit downstream from the first detection unit in the moving direction; capturing a first image of the recording medium in an image capturing range by a first image capturing unit between the first detection unit and the first liquid discharge unit; capturing a second image of the recording medium in the image capturing range by a second image capturing unit between the first liquid discharge unit and the first image capturing unit; detecting a second movement amount of the recording medium based on the first image and the second image; determining a discharge timing of the first liquid discharge unit based on the first movement amount and the second movement amount; and determining an image capturing timing of the second image capturing unit based on the first movement amount and the second movement amount.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 7A, 7B, and 7C are diagrams illustrating an example in which a predetermined range of a continuous sheet is out of an image capturing range;

FIG. 8 is a schematic diagram illustrating an internal configuration of an image forming apparatus according to a second embodiment;

Figure 1:
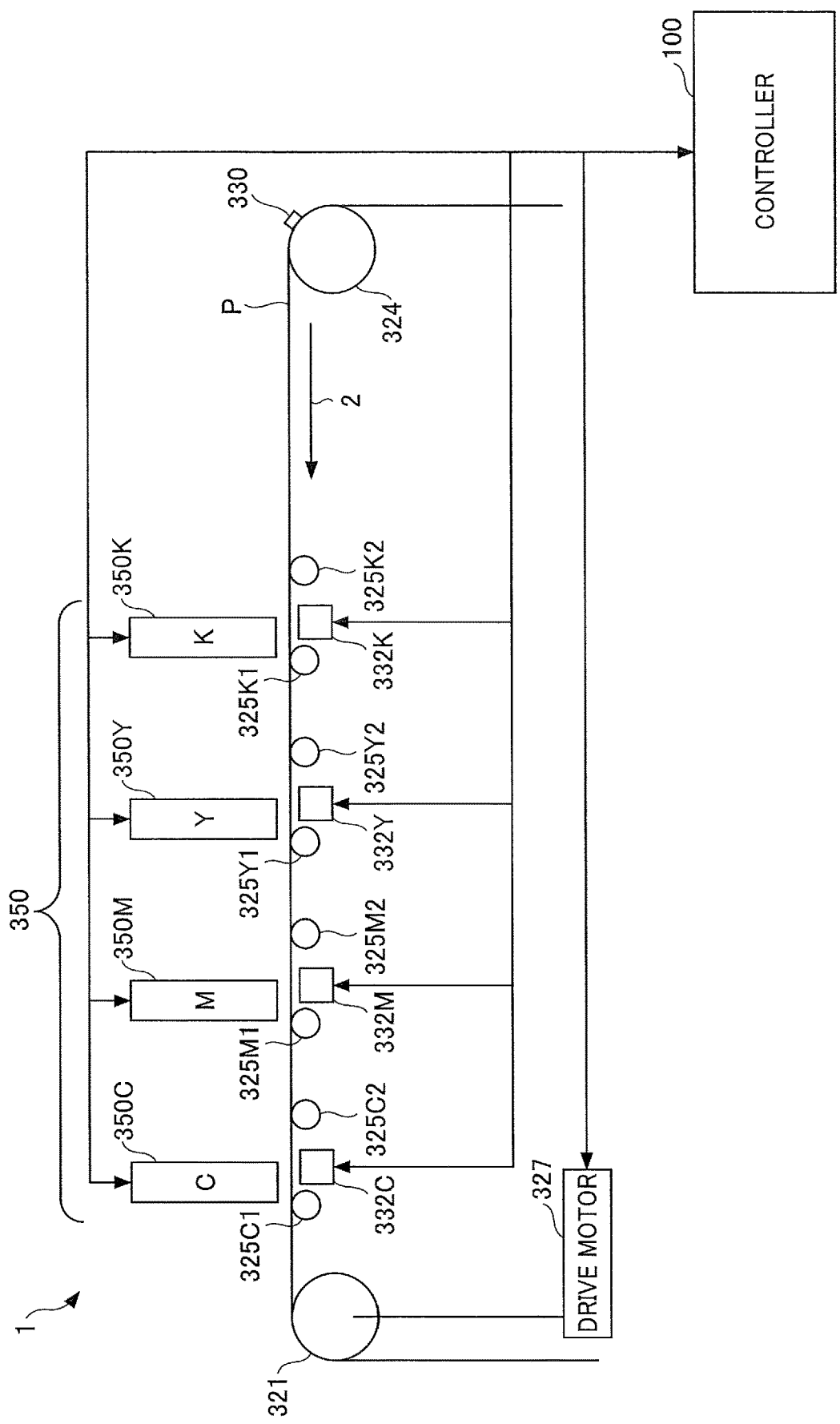
FIG. 1 is a schematic diagram illustrating an internal configuration of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

In embodiments of the present disclosure, liquid is discharged onto a recording medium that is moved in a predetermined moving direction. In addition, a first detection unit detects a first movement amount of the recording medium, and a first liquid discharge unit discharges liquid to the recording medium in an area downstream from the first detection unit in the moving direction.

Further, a first image capturing unit captures a first image of the recording medium in a predetermined image capturing range between the first detection unit and the first liquid discharge unit. A second image capturing unit captures a second image of the recording medium in the image capturing range between the first liquid discharge unit and the first image capturing unit. A second movement amount of the recording medium is detected based on the first image and the second image.

Then, based on the first movement amount and the second movement amount, the discharge timing of the first liquid discharge unit and the image capturing timing of the second image capturing unit are determined.

For example, in a configuration in which the image capturing timing of the second image capturing unit is determined based only on the first movement amount, when the movement amount error of the recording medium is large, an image captured region of the recording medium captured by the first image capturing unit in a predetermined image capturing range may be out of the image capturing range of the second image capturing unit. In this case, since there is no overlapping region between the first image and the second image, the second movement amount is not detected by, for example, a cross-correlation calculation of the first image and the second image, and the discharge timing of the first liquid discharge unit is not accurately determined. The movement amount error includes expansion and contraction of the recording medium in the moving direction, slippage of the recording medium, and the like.

On the other hand, in embodiments of the present disclosure, the first movement amount is corrected using data of the second movement amount detected based on the first image and the second image, and the image capturing timing of the second image capturing unit is determined. For example, when the second movement amount is periodically detected, the first movement amount is corrected using the data of the second movement amount detected last time and held by a holding unit, and the current image capturing timing of the second image capturing unit is determined.

The second movement amount detected at a position closer to the second image capturing unit than the first detection unit is used. Such a configuration can reduce the influence of the movement amount error and restrain the image captured region of the recording medium from being out of the image capturing range of the second image capturing unit, compared to a configuration in which the image capturing timing of the second image capturing unit is determined based on only the first movement amount. Accordingly, the second movement amount can be detected, and the discharge timing of the first liquid discharge unit can be accurately determined.

Below, embodiments of the present disclosure are described with reference to the accompanying drawings. In the drawings, the same components are denoted by the same reference numerals, and redundant description is omitted as appropriate.

Further, the embodiments described below are some examples of a liquid discharge apparatus for embodying the technical idea of the disclosure, and embodiments of the disclosure are not limited to the embodiments described below. The shapes of components, relative arrangements thereof, values of parameters, and the like described below are not intended to limit the scope of the present invention thereto but are intended to exemplify the present invention unless otherwise specified. The size, positional relationship, and the like of members illustrated in the drawings may be magnified for clarity of description.

In the description of the following embodiment, an inkjet type image forming apparatus that forms an image by discharging ink onto a continuous sheet, which is a long sheet of paper, is taken as an example. Here, the continuous sheet is an example of a recording medium, and the ink is an example of liquid.

Note that image formation, recording, printing, printing, and printing in the terms of the embodiments are synonymous. Examples of "recording medium" include recording media such as sheet of paper, recording paper, recording sheet of paper, plain paper, glossy paper, film, and cloth. The material of the recording medium may be paper, thread, fiber, fabric, leather, metal, plastic, glass, wood, ceramics, or the like, as long as the liquid can adhere even temporarily. The recording medium is not limited to a sheet shape, and may be a structure such as a wall or a ceiling, or a side surface, a bottom surface, an upper surface, or the like of a cardboard. The surface of a three dimensional object fixed to the ground, facilities, or the like may be used as the recording medium.

Further, the term "liquid" includes any liquid having a viscosity or a surface tension that can be discharged from a liquid discharge unit such as the first liquid discharge unit. The "liquid" is not limited to a particular liquid and may be any liquid having a viscosity or a surface tension to be discharged from a liquid discharge unit. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. The above-described examples can be used, for example, for inkjet inks, surface treatment liquids, liquids for forming constituent elements of electronic elements and light-emitting elements, and resist patterns of electronic circuits.

The liquid discharge unit such as the first liquid discharge unit is a functional component that discharges and jets liquid from a nozzle. Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

Below, a description is given of an embodiment of the present disclosure.

Configuration Example of Image Forming Apparatus 1

First, a configuration of an image forming apparatus 1 according to a first embodiment will be described with reference to FIG. 1. FIG. 1 is a schematic diagram illustrating the internal configuration of an image forming apparatus 1 according to the present embodiment.

In this configuration, each of head units 350K, 350Y, 350M, and 350C discharges ink to apply the ink to the front side of a continuous sheet P to form an image. The head units 350K, 350Y, 350M, and 350C are collectively referred to as a head unit group 350.

The head unit 350K discharges black ink, the head unit 350Y discharges yellow ink, the head unit 350M discharges magenta ink, and the head unit 350C discharges cyan ink. A color image is formed on the continuous sheet P with the respective color inks. In the following description, black, yellow, magenta, and cyan may be referred to as K, Y, M, and C, respectively, to simplify the description.

As illustrated in FIG. 1, the head units 350K, 350Y, 350M, and 350C are provided around the continuous sheet P.

In this configuration, the continuous sheet P is stretched across a drive roller 321, a conveyance roller 324, and eight support rollers 325K1, 325K2, 325Y1, 325Y2, 325M1, 325M2, 325C1, and 325C2. The continuous sheet P is driven by the drive roller 321 rotated by a drive motor 327 and moves along a moving direction indicated by arrow 2 (hereinafter, moving direction 2) in FIG. 1. The moving direction 2 is a direction in which the continuous sheet P moves by the rotation of the drive roller 321.

The eight support rollers 325K1, 325K2, 325Y1, 325Y2, 325M1, 325M2, 325C1, and 325C2 facing the head unit group 350 maintain a tensile state of the continuous sheet P when ink is discharged from each head unit.

For example, a rotary encoder 330 is provided with the conveyance roller 324. The rotary encoder 330 is an example of a first detection unit that detects a first movement amount of the continuous sheet P moving along with the rotation of the conveyance roller 324.

The rotary encoder 330 reads scale marks disposed at predetermined intervals on the conveyance roller 324 along the rotation direction and counts pulse signals generated according to the scale marks, to detect a rotation angle $\theta$ of the conveyance roller 324. The rotation angle $\theta$ is converted into a length by the following formula (1), thus allowing detection of the movement amount L (millimeters (mm)) of the continuous sheet P in the moving direction 2 after the continuous sheet P passes through the position of the rotary encoder 330.

$$L = A \times \theta / 2 \quad (1)$$

In the formula (1), A represents the diameter of the conveyance roller 324. The movement amount L is an example of a first movement amount.

In this configuration, a sensor device 332K is disposed between the support roller 325K1 and the support roller 325K2 and upstream from the discharge position of the head unit 350K in the moving direction of the continuous sheet P.

The sensor device 332Y is disposed between the support roller 325Y1 and the support roller 325Y2 and upstream from the discharge position of the head unit 350Y in the moving direction of the continuous sheet P.

Similarly, the sensor device 332M is disposed between the support roller 325M1 and the support roller 325M2 and upstream from the discharge position of the head unit 350M in the moving direction of the continuous sheet P.

The sensor device 332C is disposed between the support roller 325C1 and the support roller 325C2 and upstream from the discharge position of the head unit 350C in the moving direction of the continuous sheet P.

Each of the sensor devices 332K, 332Y, 332M and 332C has an image sensor. The image sensor emits incoherent light such as light emitted by a light emitting diode (LED) to the continuous sheet P, which is an object to be inspected, and captures an image of the surface of the continuous sheet P in a predetermined capturing range. The image capturing range (field of view) is determined by, for example, an image capturing element included in the image sensor and an angle of view of an image capturing lens.

A background pattern made of paper fibers or the like is formed on the surface of the continuous sheet P, and the pattern of the background pattern differs depending on the position of the continuous sheet P. The sensor devices 332K, 332Y, 332M, and 332C capture images of the surface of the continuous sheet P to capture images of the background pattern.

The sensor devices 332K, 332Y, 332M, and 332C output the images captured by the image sensors included in the sensor devices to a controller 100.

The head unit 350Y is an example of a first liquid discharge unit that discharges Y-color ink onto the continuous sheet P in an area downstream from the rotary encoder 330 in the moving direction 2. The sensor device 332K is an example of a first image capturing device that captures a first image of the continuous sheet P in a predetermined image capturing range in an area between the rotary encoder 330 and the head unit 350Y.

The sensor device 332Y is an example of a second image capturing device that captures a second image of the continuous sheet P in a predetermined image capturing range in an area between the head unit 350Y and the sensor device 332K. The head unit 350K is an example of a second liquid discharge unit that discharges K-color ink onto the continuous sheet P in an area between the sensor device 332K and the sensor device 332Y.

The controller 100 is a control board that detects a movement amount of the continuous sheet P in the moving direction 2 based on image data obtained from the sensor devices 332K, 332Y, 332M, and 332C. The controller 100 controls the discharge timing of at least the head unit 350Y according to the movement amount of the continuous sheet P in the moving direction 2. The controller 100 determines the image capturing timing of at least the sensor device 332Y according to the movement amount of the continuous sheet P in the moving direction 2.

The controller 100 outputs a drive signal to the drive motor 327 and controls the rotation of the drive motor 327, the movement of the continuous sheet P according to the rotation of the drive motor, and the like.

Example of Hardware Configuration of Controller 100

Figure 2:
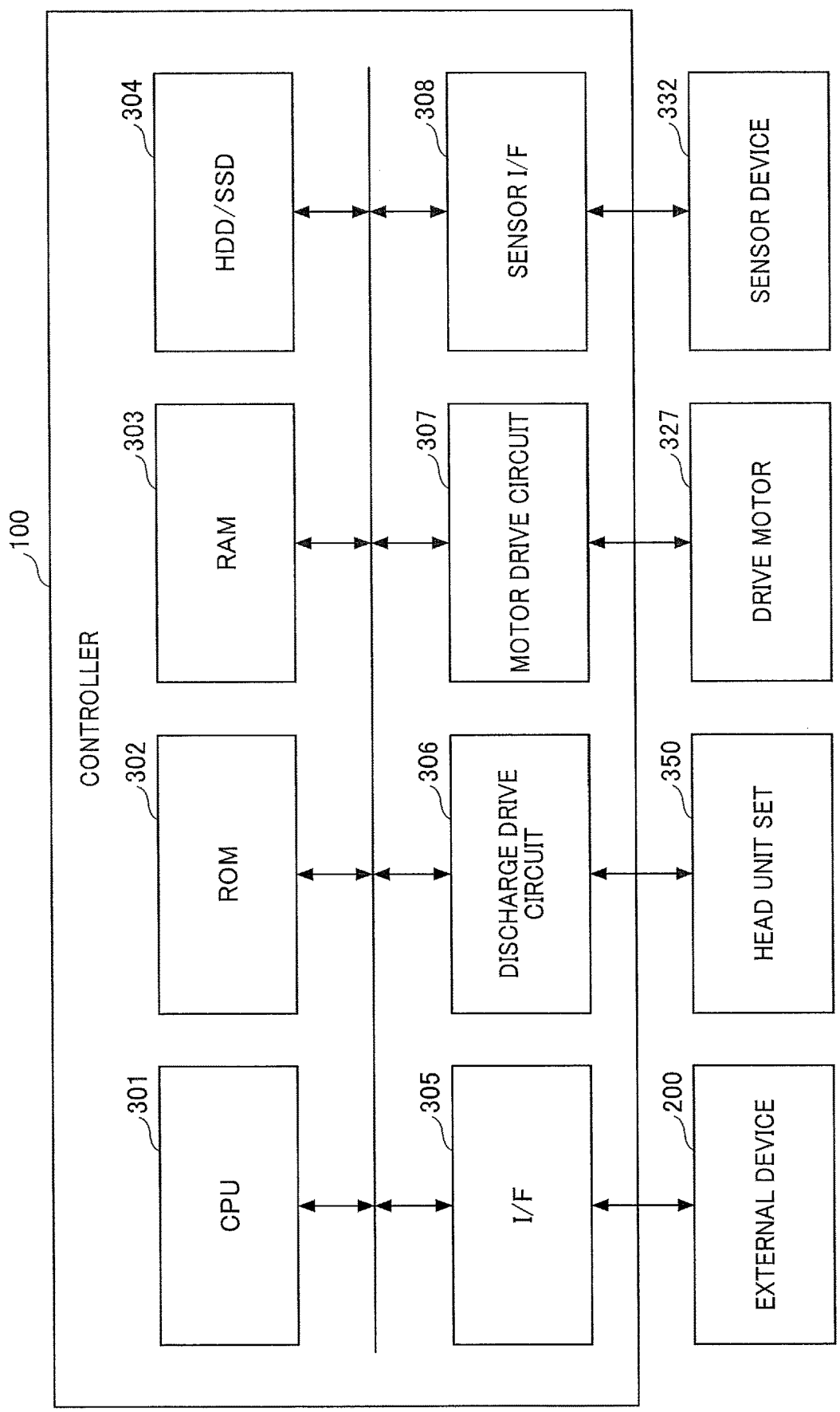
FIG. 2 is a block diagram illustrating a hardware configuration of a controller according to an embodiment.

Next, the hardware configuration of the controller 100 included in the image forming apparatus 1 will be described with reference to FIG. 2. FIG. 2 is a block diagram illustrating an example of the hardware configuration of the controller 100.

As illustrated in FIG. 2, the controller 100 includes a central processing unit (CPU) 301, a read only memory (ROM) 302, a random access memory (RAM) 303, and a hard disk drive (HDD)/solid state drive (SSD) 304. The controller 100 further includes an interface (I/F) 305, a discharge drive circuit 306, a motor drive circuit 307, and a sensor I/F 308.

The CPU 301 uses the RAM 303 as a working area and executes a program stored in the ROM 302.

The HDD/SSD 304 is used as a storage device and stores a preset setting value. The data stored in the HDD/SSD 304 may be read and used by the CPU 301 when the CPU 301 executes a program.

The I/F 305 is an interface that enables communication with an external device 200. The external device 200 is, for example, a client personal computer (PC). However, examples of the external device may include an external server, another image forming apparatus, or the like. Communication with an external device may be enabled via a network such as the Internet or a local access network (LAN).

The discharge drive circuit 306 is an electric circuit that causes the head units 350K, 350Y, 350M, and 350C included in the head unit group 350 to discharge ink, based on control signals input from the CPU 301.

The motor drive circuit 307 is an electric circuit that drives the drive motor 327 based on control signals input from the CPU 301.

The sensor I/F 308 is an interface that enables communication with the sensor devices 332K, 332Y, 332M and 332C. The sensor device(s) 332 may be used as a generic name of the sensor devices 332K, 332Y, 332M, and 332C.

For example, the sensor I/F 308 causes the sensor devices 332 to capture images based on control signals input from the CPU 301. The control items of the sensor devices 332 include an image capturing timing, a shutter speed, an irradiation timing of a laser beam, an irradiation light amount of a laser beam, and the like. The sensor I/F 308 can input image data captured by the sensor devices 332 from the sensor devices 332.

Example of Functional Configuration of Controller 100

Figure 3:
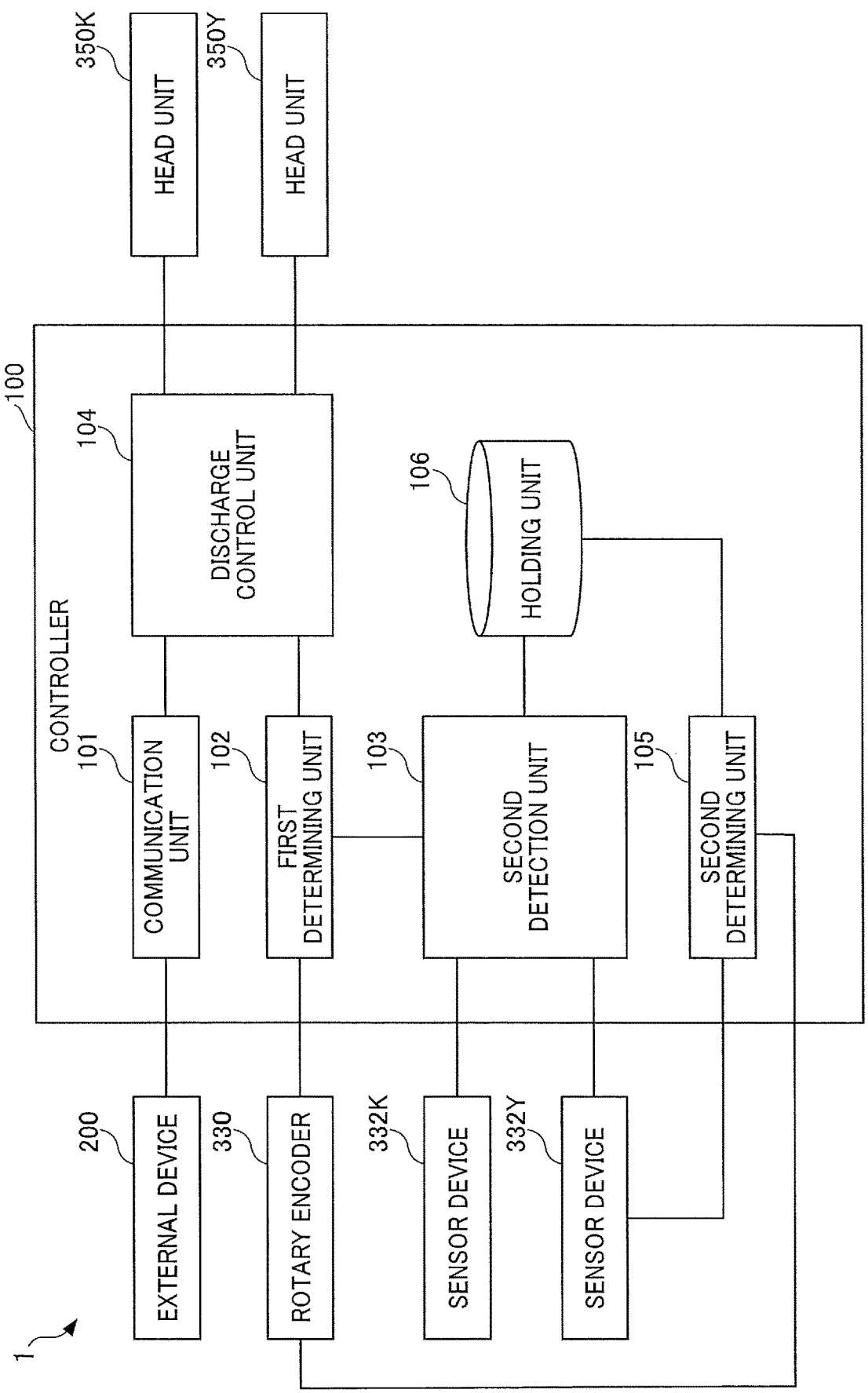
FIG. 3 is a block diagram illustrating a functional configuration of a controller according to the first embodiment.

Next, a functional configuration of the controller 100 according to the first embodiment will be described with reference to FIG. 3. FIG. 3 is a block diagram illustrating an example of the functional configuration of the controller 100.

As illustrated in FIG. 3, the controller 100 includes a communication unit 101, a first determining unit 102, a second detection unit 103, a discharge control unit 104, a second determining unit 105, and a holding unit 106.

Each of the above-described units is a function or means for functioning that is implemented by any of the components illustrated in FIG. 2 operating in response to an instruction from the CPU 301 in accordance with a program developed from the ROM 302 on the RAM 303. Although FIG. 3 illustrates a main configuration of the controller 100, the controller 100 may have other configurations.

The communication unit 101 transmits and receives various types of information between the external device 200 and the controller 100. In the present embodiment, the controller 100 receives image data, which is a source of an image to be formed on the continuous sheet P, from the external device 200 via the communication unit 101.

The second detection unit 103 detects the second movement amount of the continuous sheet P based on the first image captured by the sensor device 332K and the second image captured by the sensor device 332Y.

For example, when the conveyance speed of the continuous sheet P is V (mm/s) and the distance between the sensor device 332K and the sensor device 332Y in the moving direction 2 is D (mm), the time T for the continuous sheet P to pass between the sensor device 332K and the sensor device 332Y is D/V (s).

Therefore, when the first image is captured at the timing when the continuous sheet P passes through the sensor device 332K and then the second image is captured after the time T1 has elapsed, the first image and the second image are images of the same background pattern formed at the same position on the continuous sheet P unless there is an error in the movement amount of the continuous sheet P.

However, when the movement amount error ΔD occurs due to, for example, expansion and contraction of the continuous sheet P, the background pattern of the second image is shifted by the movement amount error ΔD with respect to the first image. The second detection unit 103 detects the movement amount error ΔD.

For example, the distance from the rotary encoder 330 to the sensor device 332K is N1 (*mm*), and the distance from the rotary encoder 330 to the sensor device 332Y is N2 (mm).

The sensor device 332K captures the first image at the timing when the movement amount L reaches the distance N1, and the sensor device 332Y captures the second image at the timing when the movement amount L reaches the distance N2. The second detection unit 103 performs a cross-correlation operation between the first image and the second image to detect a movement amount error ΔD.

Since the movement amount of the continuous sheet P can be calculated by adding the movement amount error ΔD to the distance D, it can be said that the second detection unit 103 detects the movement amount. The movement amount error ΔD is an example of the second movement amount.

The second detection unit 103 outputs the detected movement amount error ΔD to the first determining unit 102 and outputs the movement amount error ΔD to the holding unit 106 so that the movement amount error ΔD is held in the holding unit 106.

The first determining unit 102 determines the discharge timing of the head unit 350Y based on the movement amount L detected by the rotary encoder 330 and the movement amount error ΔD detected by the second detection unit 103.

Here, the distance from the rotary encoder 330 to the head unit 350K is M1 (mm), and the distance from the rotary encoder 330 to the head units 350Y is M2 (mm).

For example, after the continuous sheet P passes through the position of the rotary encoder 330, the head unit 350K discharges at the timing when the movement amount L reaches the distance M1, and the head unit 350Y discharges at the timing when the movement amount L reaches the distance M2. In such a case, if there is no movement amount error ΔD, K-color ink and Y-color ink are applied on the continuous sheet P in a desired positional relationship.

However, if there is the movement amount error ΔD, the timing at which the continuous sheet P reaches the position of the head unit 350Y is shifted. Accordingly, the applied positions of the Y-color ink with respect to the K-color ink on the continuous sheet P are shifted from predetermined positions. As a result, a color shift occurs in the image, and the quality of the image deteriorates.

The first determining unit 102 corrects the movement amount L based on the movement amount error ΔD and determines the timing at which the movement amount L+AD is equal to the distance M2 as the discharge timing of the head unit 350Y.

The discharge control unit 104 causes the head unit 350K to discharge ink and also causes the head unit 350Y to discharge ink at the discharge timing determined by the first determining unit 102.

The head unit 350Y discharges ink at the timing determined by the first determining unit 102, so that ink can be discharged at an accurate timing obtained by correcting the influence of the movement amount error ΔD with respect to the discharge of the head unit 350K.

The second determining unit 105 determines the image capturing timing of the sensor device 332Y based on the movement amount L and the movement amount error ΔD.

Here, the second detection unit 103 detects the movement amount error ΔD from a shift between image patterns of the same background pattern duplicately included in the first image and the second image. On the other hand, the image capturing range of each of the sensor device 332K and the sensor device 332Y is limited by, for example, the size of the image capturing element used and the angle of view of the image capturing lens. Accordingly, when the movement amount error ΔD increases, an image pattern of the background pattern included in the first image may not be duplicately included in the second image. If the image pattern of the background pattern included in the first image is not duplicately included in the second image, the movement amount error ΔD is not detected based on the first image and the second image.

For example, it is assumed that the sensor device 332Y captures the second image at a timing when the movement amount L of the continuous sheet P reaches the distance M2. In this case, since the distance between the position of the rotary encoder 330 serving as a reference and the position of the sensor device 332Y is long, the movement amount error ΔD increases. Accordingly, the first image and the second image are unlikely to include the same background pattern.

Therefore, the second determining unit 105 corrects the movement amount L using the data of the movement amount error ΔD(t−n·Δt) held in the holding unit 106. Then, the timing at which the corrected movement amount L+ΔD(t−n·Δt) reaches the distance M2 is determined as the image capturing timing of the second image by the sensor device 332Y.

Here, t represents the current time, n represents an integer (=1, 2, 3, . . . ), and Δt represents a detection interval (sampling interval) of the movement amount error ΔD detected periodically. The movement amount error ΔD(t−n·Δt) indicates a movement amount error detected at a time earlier than the current time t by n times of Δt. For example, in the case of a movement amount error detected one time before the current time, n=1 and the movement amount error is ΔD(t−Δt). In the present embodiment, n=1 is described as an example.

The holding unit 106 holds the movement amount error ΔD(t−Δt) detected in the past among the movement amount errors ΔD detected periodically. The function of the holding unit 106 can be implemented by, for example, the RAM 303 illustrated in FIG. 2.

The second detection unit 103 captures the second image at the capturing timing determined by the second determining unit 105 and detects the movement amount error ΔD(t). The second detection unit 103 causes the holding unit 106 to hold the movement amount error ΔD(t) and updates the data of the movement amount error ΔD(t−Δt) held by the holding unit 106.

Since the movement amount error ΔD(t−Δt) detected at a position closer to the sensor device 332Y than the rotary encoder 330 is used, the influence of the movement amount error is reduced compared to a configuration in which the image capturing timing of the sensor device 332Y is determined based only on the movement amount L1. Accordingly, the image captured region of the continuous sheet P captured by the sensor device 332K can be restrained from being out of the image capturing range of the sensor device 332Y.

In addition, in the case of the continuous sheet P that circulates, the movement amount error has a relatively large component that occurs periodically. Therefore, the influence of the movement amount error on the discharge timing can be appropriately corrected using the data of the movement amount error ΔD(t−Δt) detected in the past.

The movement amount error ΔD(t−n·Δt) detected in the past is not limited to one time before (n=1), and may be two or more times before (n≥2).

Here, in a case where the movement amount error ΔD is first detected immediately after the start of image formation, the second determining unit 105 determines the image capturing timing of the second image by using only the movement amount L1 without performing correction.

Therefore, immediately after the start of image formation, the movement amount error ΔD increases, the same region of the continuous sheet P is not duplicately included in the first image and the second image, and it is considered that the movement amount error ΔD cannot be detected. However, the movement amount error ΔD includes a relatively large component generated by expansion and contraction of the continuous sheet P which absorbs moisture of the applied ink. Since ink has not been applied to the continuous sheet P immediately after the start of image formation, the movement amount error ΔD is smaller than that after ink has been applied.

For this reason, in a case where the sensor device 332Y captures an image for the first time immediately after the start of image formation, even if the image capturing timing of the second image is determined using only the movement amount L1, the same region of the continuous sheet P is highly likely to be duplicately included in the first image and the second image. Thus, the movement amount error ΔD can be detected.

Operation Example of Image Forming Apparatus 1

Next, the operation of the image forming apparatus 1 will be described with reference to FIGS. 4 and 5.

Operation Timing

Figure 4:
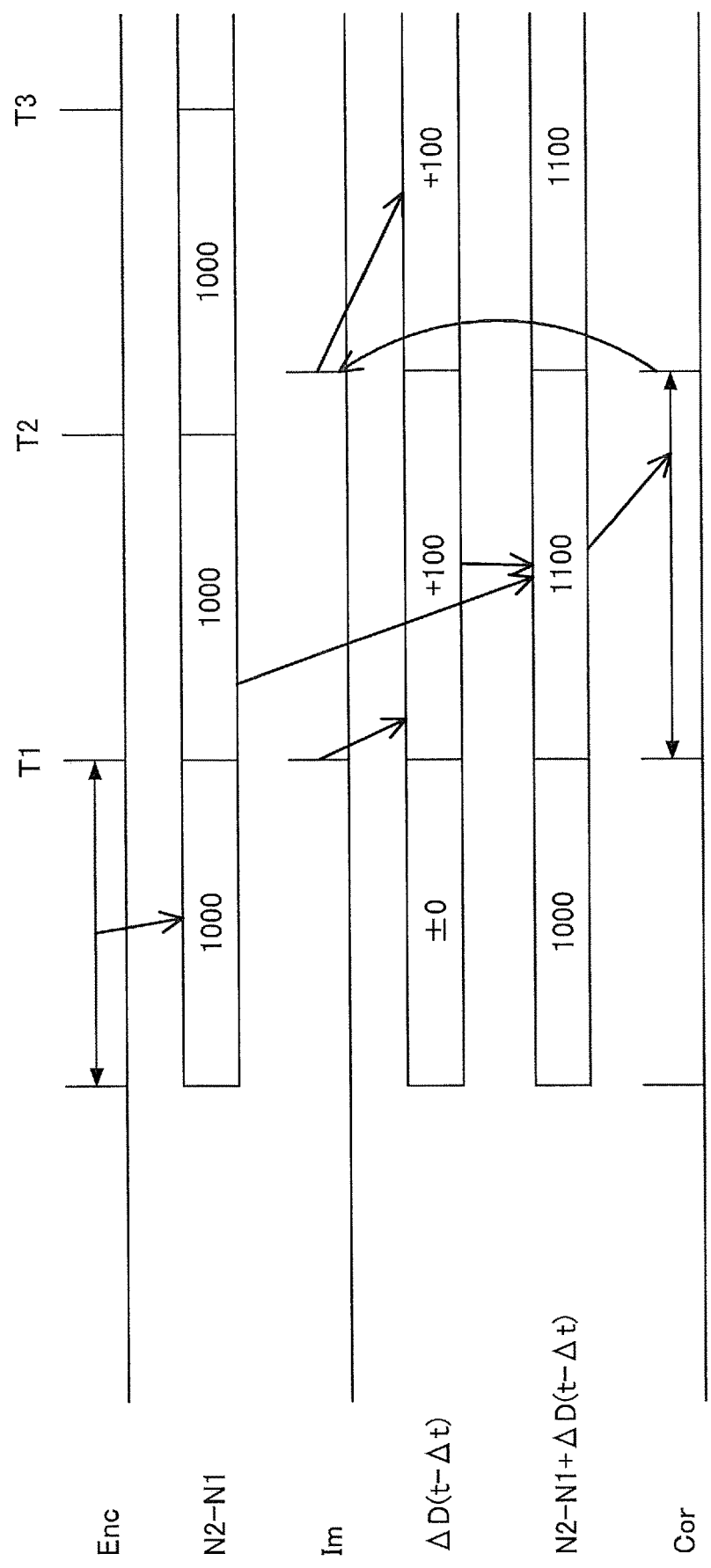
FIG. 4 is a timing chart illustrating an example of image capturing and discharge timing.

FIG. 4 is a timing chart illustrating an example of image capturing and discharge timings.

An Enc signal illustrated in the uppermost are of FIG. 4 indicates a signal output from the rotary encoder 330. FIG. 4 illustrates an output signal for every 1000 pulses as an example. The N2−N1 signal below the Enc signal indicates the number of pulses of the rotary encoder 330 corresponding to the distance of N2−N1. The distance between the sensor device 332K and the sensor device 332Y corresponds to a distance calculated from the number of pulses of the rotary encoder 330 between the sensor device 332K and the sensor device 332Y.

The Im signal below the N2−N1 signal indicates the image capturing timing of the sensor device 332Y. The ΔD signal below the Im signal indicates the number of pulses of the rotary encoder 330 corresponding to the movement amount error ΔD(t−Δt). The N2−N1+ΔD(t−Δt) signal below the ΔD signal indicates the number of pulses of the rotary encoder 330 corresponding to a corrected distance obtained by correcting the distance between the sensor device 332K and the sensor device 332Y with the movement amount error ΔD(t−Δt). The Cor signal below the N2−N1+ΔD(t−Δt) signal indicates a corrected signal obtained by correcting the timing of the Im signal determined by the second determining unit 105.

In the description of FIG. 4, it is assumed that the number of pulses of the rotary encoder 330 corresponding to the distance of N2−N1 is 1000 pulses, and the number of pulses of the rotary encoder 330 corresponding to the movement amount error ΔD(t−Δt) is +100 pulses.

At time T1, since the image capturing of the sensor device 332Y corresponds to the first image capturing after the image forming apparatus 1 starts image formation, the correction by the second determining unit 105 is not performed. The N2−N1+ΔD(t−Δt) signal thus remains 1000 pulses. At this time, the second detection unit 103 detects +100 pulses as the movement amount error ΔD and causes the holding unit 106 to hold the +100 pulses.

Next, at the time T2, the second determining unit 105 acquires the movement amount error ΔD(t−Δt) with reference to the holding unit 106 and adds the movement amount error ΔD(t−Δt) to the N2−N1 signal to correct the image capturing timing of the sensor device 332Y. As a result, the N2−N1+ΔD(t−Δt) signal is corrected to 1100 pulses, and the timings of the Cor and Im signals are corrected. The sensor device 332Y performs image capturing at the timing of the corrected Im signal. At this time, the second detection unit 103 detects +100 pulses as the movement amount error ΔD and causes the holding unit 106 to hold the +100 pulses.

At the time T3, processing similar to the processing at the time T2 is performed, and thereafter, similar processing is repeated. Accordingly, the second determining unit 105 determines the image capturing timing of the sensor device 332Y, and the second detection unit 103 can detect the movement amount error ΔD.

Operation Flow

Figure 5:
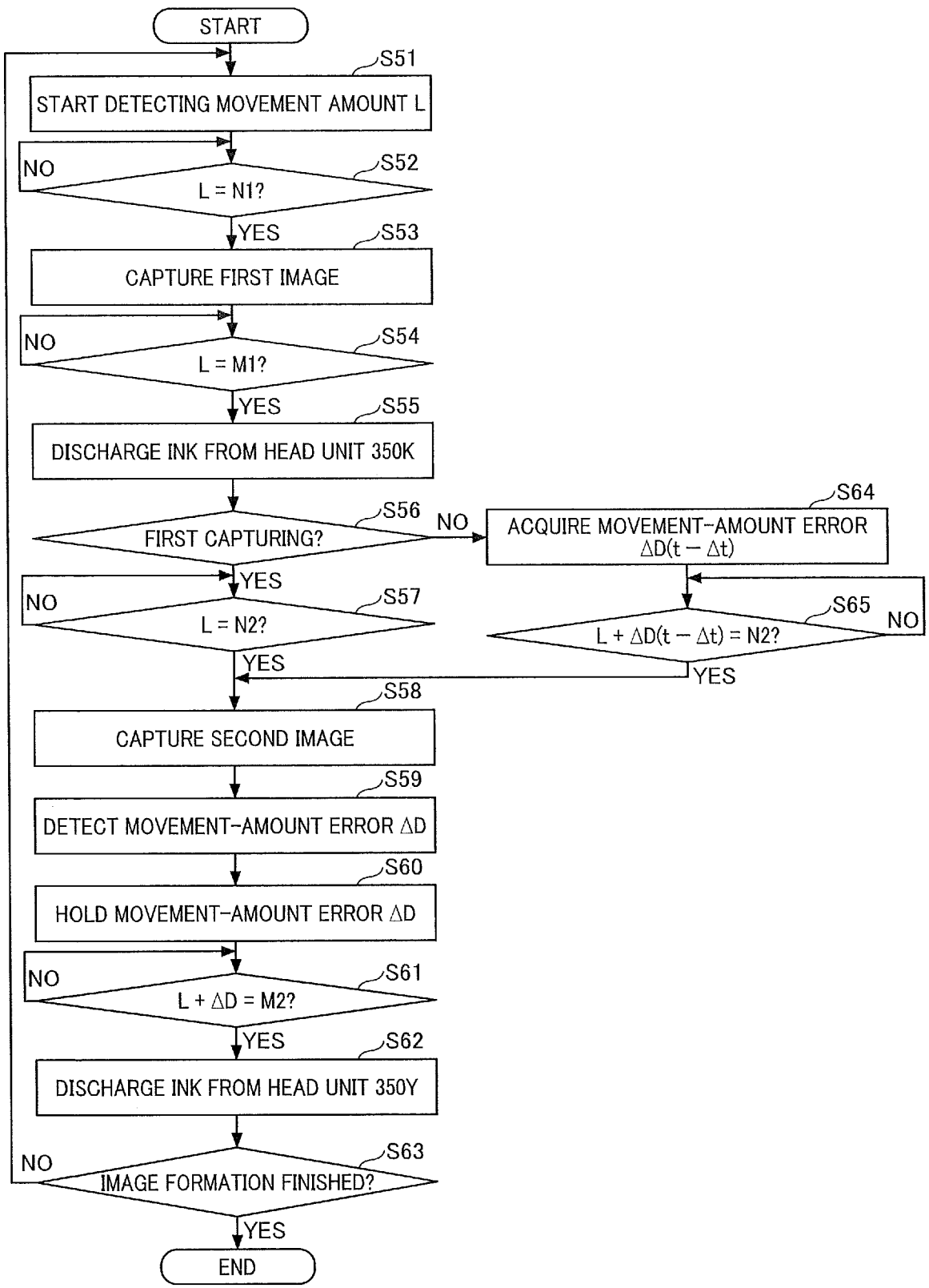
FIG. 5 is a flowchart illustrating an operation of an image forming apparatus according to an embodiment.

FIG. 5 is a flowchart illustrating an example of the operation of the image forming apparatus 1. FIG. 5 illustrates an operation triggered when the image forming apparatus 1 starts image formation.

First, in step S51, the rotary encoder 330 starts detecting the movement amount L of the continuous sheet P.

Subsequently, in step S52, the second detection unit 103 determines whether the movement amount L is equal to the distance N1.

When it is determined that the movement amount L is not equal to the distance N1 in step S52 (No in step S52), the second detection unit 103 performs the operation of step S52 again. On the other hand, when it is determined that the movement amount L is equal to the distance N1 in step S52 (Yes in step S52), in step S53, the sensor device 332K captures the first image in response to an instruction from the second detection unit 103.

Subsequently, in step S54, the discharge control unit 104 determines whether the movement amount L is equal to the distance M1.

When it is determined that the movement amount L is not equal to the distance M1 in step S54 (No in step S54), the discharge control unit 104 performs the operation of step S54 again. On the other hand, when it is determined that the movement amount L is equal to the distance M1 in step S54 (Yes in step S54), in step S55, the head unit 350K discharges K-color ink in response to an instruction of the discharge control unit 104.

Subsequently, in step S56, the second determining unit 105 determines whether it is the first image capturing after the image forming apparatus 1 starts image formation.

If it is determined in step S56 that it is the first image capturing (Yes in step S56), in step S57, the second detection unit 103 determines whether the movement amount L is equal to the distance N2.

When it is determined that the movement amount L is not equal to the distance N2 in step S57 (No in step S57), the second detection unit 103 performs the operation of step S57 again. On the other hand, in a case where it is determined that the movement amount L is equal to the distance N2 in step S57 (Yes in step S57), the second detection unit 103 instructs the sensor device 332Y to capture the second image. In step S58, the sensor device 332Y captures the second image in response to the instruction.

Subsequently, in step S59, the second detection unit 103 detects the movement amount error ΔD based on the first image and the second image and outputs the movement amount error ΔD to the first determining unit 102.

Subsequently, in step S60, the second detection unit 103 causes the holding unit 106 to hold the movement amount error ΔD.

Subsequently, in step S61, the first determining unit 102 determines whether the movement amount L+ΔD is equal to the distance M2.

When it is determined that the movement amount L+ΔD is not equal to the distance M2 in step S61 (No in step S61), the first determining unit 102 performs the operation of step S61 again.

On the other hand, when it is determined that the movement amount L+ΔD is equal to the distance M2 in step S61 (Yes in step S61), the head unit 350Y discharges Y-color ink in response to an instruction of the first determining unit 102.

Subsequently, in step S63, the controller 100 determines whether to end the image formation.

If the controller 100 determines to end the image formation in step S63 (Yes in step S63), the image forming apparatus 1 ends the image formation. On the other hand, when the controller 100 determines not to end the image formation (No in step S63), the process returns to step S51, and the operations of step S51 and the subsequent steps are performed again.

On the other hand, if it is determined in step S56 that it is not the first image capturing (No in step S56), in step S63, the second determining unit 105 acquires the movement amount error ΔD(t−Δt) with reference to the holding unit 106.

Subsequently, in step S64, the second determining unit 105 determines whether the movement amount L+ΔD(t−Δt) is equal to the distance N2.

When it is determined that the movement amount L+ΔD (t−Δt) is not equal to the distance N2 in step S64 (No in step S64), the second determining unit 105 performs the operation of step S64 again. On the other hand, when it is determined that the movement amount L+ΔD(t−Δt) is equal to the distance N2 (Yes in step S64), the second determining unit 105 instructs the sensor device 332Y to capture the second image, and the operation of step S58 and the subsequent steps are performed again.

In this way, the image forming apparatus 1 can determine the discharge timing of the head unit 350Y based on the movement amount L and the movement amount error ΔD and determine the image capturing timing of the sensor device 332Y based on the movement amount L and the movement amount error ΔD.

Although FIG. 5 illustrates an example in which the capturing of the second image by the sensor device 332Y and the discharge by the head unit 350Y are performed at different timings, embodiments of the present disclosure are not limited to the example.

For example, the capturing of the second image by the sensor device 332Y and the discharge by the head unit 350Y may be performed at the same timing. Such a configuration reduces the number of objects to be managed, thus facilitating the management of the timing. In this case, it is preferable that the distance between the head units 350K and 350Y, which is obtained by M2−M1, is equal to the distance between the sensor device 332K and the sensor device 332Y, which is obtained by N2−N1.

Effects of Image Forming Apparatus 1

Next, functions and effects of the image forming apparatus 1 will be described.

In the related art, there is known an image forming apparatus in which a liquid discharge unit discharges ink to form an image on a recording medium such as a continuous sheet. In such an image forming apparatus, there is a case where a rotary encoder is attached to a conveyance roller provided upstream from a liquid discharge unit in a moving direction of a continuous sheet to be moved, and each of a plurality of liquid discharge units discharges ink based on an output signal of the rotary encoder.

However, an error may occur in an actual movement amount of the continuous sheet due to, for example, a slip between the continuous sheet and a drive roller for moving the continuous sheet, expansion and contraction of the continuous sheet, and a rotation speed fluctuation of the drive roller.

Figure 6:
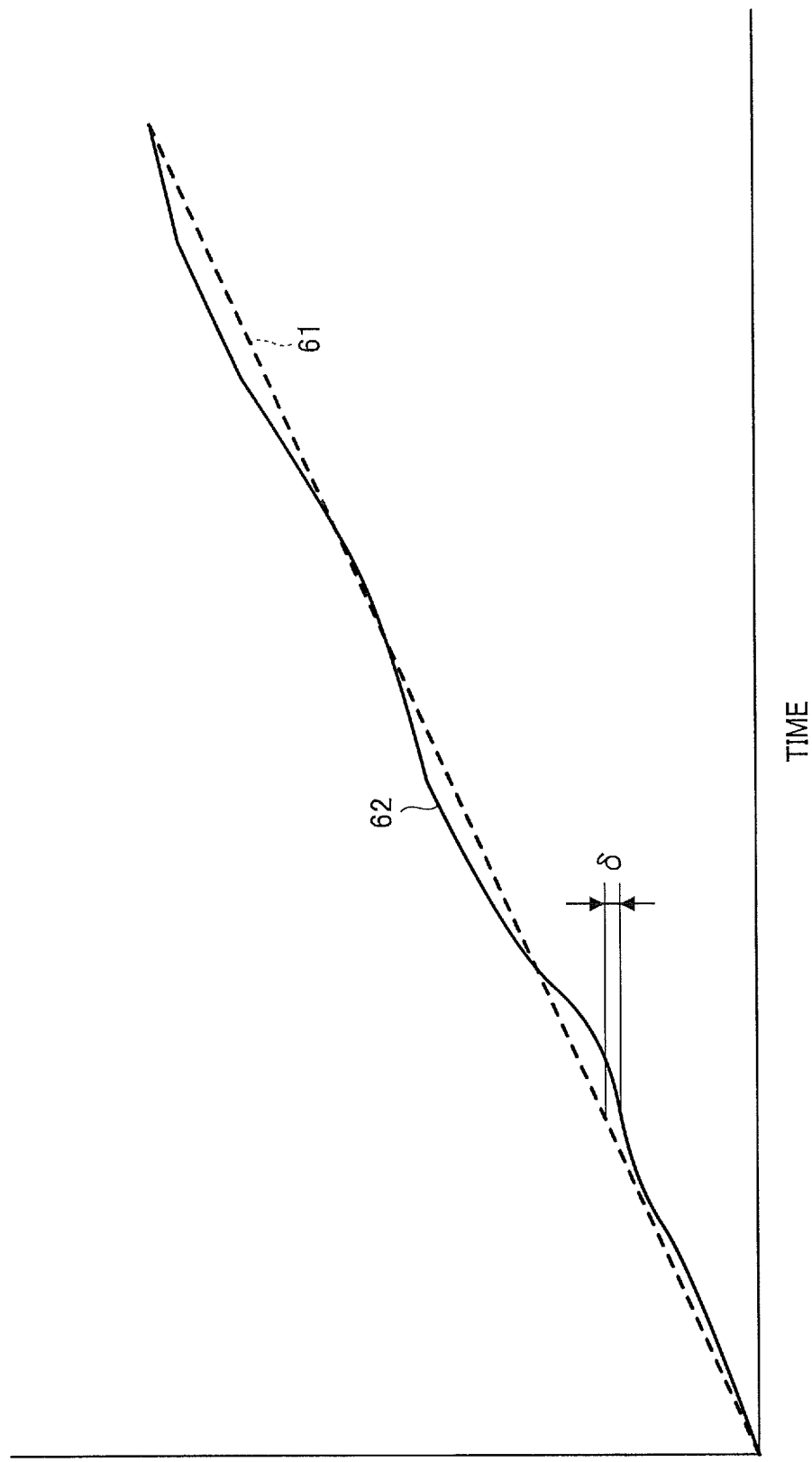
FIG. 6 is a diagram illustrating an example of the relation between output signal of a rotary encoder and movement amount of a continuous sheet.

Here, FIG. 6 is a diagram illustrating an example of a relationship between the output signal of a rotary encoder and the movement amount of a continuous sheet. In FIG. 6, the horizontal axis represents time, and the vertical axis represents the movement amount of a continuous sheet. A detected value 61 (broken line) indicates the detection value of the movement amount of the continuous sheet detected based on the output signal of the rotary encoder. An actual value 62 (solid line) indicates an actual movement amount of the continuous sheet.

As illustrated in FIG. 6, the detected value 61 and the actual value 62 deviate from each other. Of the fluctuations of the actual value 62 with respect to the detected value 61, the cycle of a component that periodically occurs substantially coincides with, for example, the outer circumference of a drive roller that moves the continuous sheet.

The discharge timing of ink by the liquid discharge unit is shifted according to the deviation between the detected value 61 and the actual value 62, and the landing positions of ink for each color on the continuous sheet are shifted, for example, as indicated by a deviation amount δ in FIG. 6. This may degrade the image quality.

In order to correct such a deviation between a detected value and an actual value, a configuration is known in which a predetermined range of a recording medium is captured by an image capturing unit, and the discharge timing of a liquid discharge unit is determined according to a movement amount error of the recording medium detected from a captured image of the predetermined range (see Japanese Unexamined Patent Application Publication No. 2018-154127).

However, in the configuration of the related art, if the movement amount error of the recording medium is large, image capturing may not be performed because the predetermined range of the recording medium departs from the image capturing range of the image capturing unit. Accordingly, the discharge timing may not be accurately determined according to the movement amount error.

Here, FIGS. 7A, 7B, and 7C are diagrams illustrating an image capturing example in a case where the movement amount error is large. FIG. 7A is a diagram illustrating an example of a first image. FIG. 7B is a diagram illustrating an example of a second image in which a movement amount error is detectable. FIG. 7C is a diagram illustrating an example of a second image in which a movement amount error is not detectable.

As illustrated in FIG. 7A, a first image 71 is a first image captured by the first image capturing unit such as the sensor device 332K. A pattern 70 is formed on the first image 71. The pattern 70 is, for example, a background pattern of a continuous sheet P. However, FIG. 7 illustrates the pattern 70 in a simplified manner. The image capturing range A indicates an image capturing range in the moving direction of the recording medium.

A second image 72 in FIG. 7B is a second image captured by the second image capturing unit such as the sensor device 332Y. Since a movement amount error ΔD1 is smaller than the image capturing range A, a pattern 70' is included in the second image 72. In this case, the deviation between the pattern 70 in the first image 71 and the pattern 70' in the second image 72 is detected by a cross-correlation calculation, and the movement amount error ΔD1 is detectable.

On the other hand, a second image 73 in FIG. 7C indicates a second image captured by the second image capturing unit such as the sensor device 332Y. Since a movement amount error ΔD2 is larger than the image capturing range A, a pattern 70" is not included in the second image 73. In this case, the deviation between the pattern 70 in the first image 71 and the pattern 70" is not detected by the cross-correlation calculation, and the movement amount error ΔD2 is not detectable.

In the present embodiment, ink (liquid) is discharged onto the continuous sheet P (recording medium) that is moved in the moving direction 2. The rotary encoder 330 serving as the first detection unit detects the movement amount L (first movement amount) of the continuous sheet P, and the head unit 350Y serving as the first liquid discharge unit discharges Y-color ink onto the continuous sheet P in an area downstream from the rotary encoder 330 in the moving direction 2.

Further, between the rotary encoder 330 and the head unit 350Y, the sensor device 332K serving as the first image capturing unit captures a first image of the continuous sheet P in a predetermined image capturing range. Furthermore, between the head unit 350Y and the sensor device 332K, the sensor device 332Y serving as the second image capturing unit captures a second image of the continuous sheet P in the image capturing range. A movement amount error $\Delta P$ (second movement amount) of the continuous sheet P is detected based on the first image and the second image.

The discharge timing of the head unit 350Y is determined based on the movement amount L and the movement amount error $\Delta D$, and the image capturing timing of the sensor device 332Y is determined based on the movement amount L and the movement amount error $\Delta D$.

For example, the holding unit 106 holds the movement amount error $\Delta D(t-n \cdot \Delta t)$ detected in the past among the movement amount errors $\Delta D$ detected periodically. The current image capturing timing of the sensor device 332Y is determined based on the movement amount L and the movement amount error $\Delta D(t-n \cdot \Delta t)$ held by the holding unit 106.

Since the movement amount error $\Delta D$ detected at a position closer to the sensor device 332Y than the rotary encoder 330 is used, the influence of the movement amount error can be reduced as compared with a configuration in which the image capturing timing of the sensor device 332Y is determined based on only the movement amount L. Such a configuration can restrain the captured region of the continuous sheet P from being out of the image capturing range of the sensor device 332Y. Accordingly, the movement amount error $\Delta D$ can be detected, and the discharge timing of the head unit 350K can be accurately determined.

In the present embodiment, for example, the capturing of the second image by the sensor device 332Y and the discharge by the head unit 350Y can be performed at the same timing. Such a configuration can reduce the number of timings to be managed, thus facilitating the management of the timings.

In addition, in the present embodiment, the head unit 350K serving as the second liquid discharge unit that discharges ink onto the continuous sheet P is disposed between the sensor device 332K and the sensor device 332Y. The first determining unit 102 determines the discharge timing of the head unit 350Y with respect to the head unit 350K. Such a configuration can accurately determine the discharge timing of the head unit 350Y with respect to the discharge of the head unit 350K.

In the above-described embodiments, the examples have been described in which the second liquid discharge unit is the head unit 350K and the first liquid discharge unit is the head unit 350Y, and the head unit 350Y is caused to discharge liquid at an accurate timing with respect to the discharge of the head unit 350K. However, embodiments of the present disclosure are not limited to the above-described examples.

Among the four head units 350K, 350Y, 350M, and 350C, any one head unit disposed more upstream in the moving direction 2 may be set as the second liquid discharge unit, and any one head unit disposed downstream from the second liquid discharge unit in the moving direction 2 may be set as the first liquid discharge unit. Such a configuration allows the first liquid discharge unit to discharge liquid at an accurate timing with respect to the discharge of the second liquid discharge unit.

Second Embodiment

Next, an image forming apparatus 1a according to a second embodiment of the present disclosure will be described. The same components as those of the first embodiment are denoted by the same reference numerals, and redundant description thereof will be appropriately omitted. The same applies to the embodiments described below.

FIG. 8 is a schematic diagram illustrating the internal configuration of an image forming apparatus 1a according to the present embodiment.

Here, in the image forming apparatus 1 according to the first embodiment, only one sensor device 332K is disposed upstream from the head unit 350K. Accordingly, the movement amount error $\Delta D$ of the continuous sheet P is not detected at the position of the head unit 350K. Since the movement amount L is not corrected by the movement amount error $\Delta D$, the discharge timing of the head unit 350K may deviate from a desired timing.

For this reason, in the present embodiment, as illustrated in FIG. 8, the image forming apparatus 1a includes a sensor device 331 disposed further upstream from the sensor device 332K in the moving direction 2. The sensor device 331 has similar configuration and function to, even if not the same configuration and function as, those of the sensor device 332K, and are different from the sensor device 332K in the arrangement position.

In this case, the head unit 350K corresponds to the first liquid discharge unit. The sensor device 331 corresponds to a first image capturing unit that captures a first image of the continuous sheet P, and the sensor device 332K corresponds to a second image capturing unit that captures a second image of the continuous sheet P.

With this configuration, the movement amount error $\Delta D$ of the continuous sheet P at the position of the head unit 350K is detected based on the first image and the second image, and the discharge timing of the head unit 350K is determined based on the movement amount L and the movement amount error $\Delta D$. The image capturing timing of the sensor device 332K is determined based on the movement amount L and the movement amount error $\Delta D$.

Accordingly, the discharge timing of the head unit 350K can be determined similarly to the head unit 350Y in the first embodiment, and the image capturing timing of the sensor device 332K can be determined similarly to the sensor device 332Y in the first embodiment. Other operational effects are the same as those described in the first embodiment.

Third Embodiment

Figure 9:
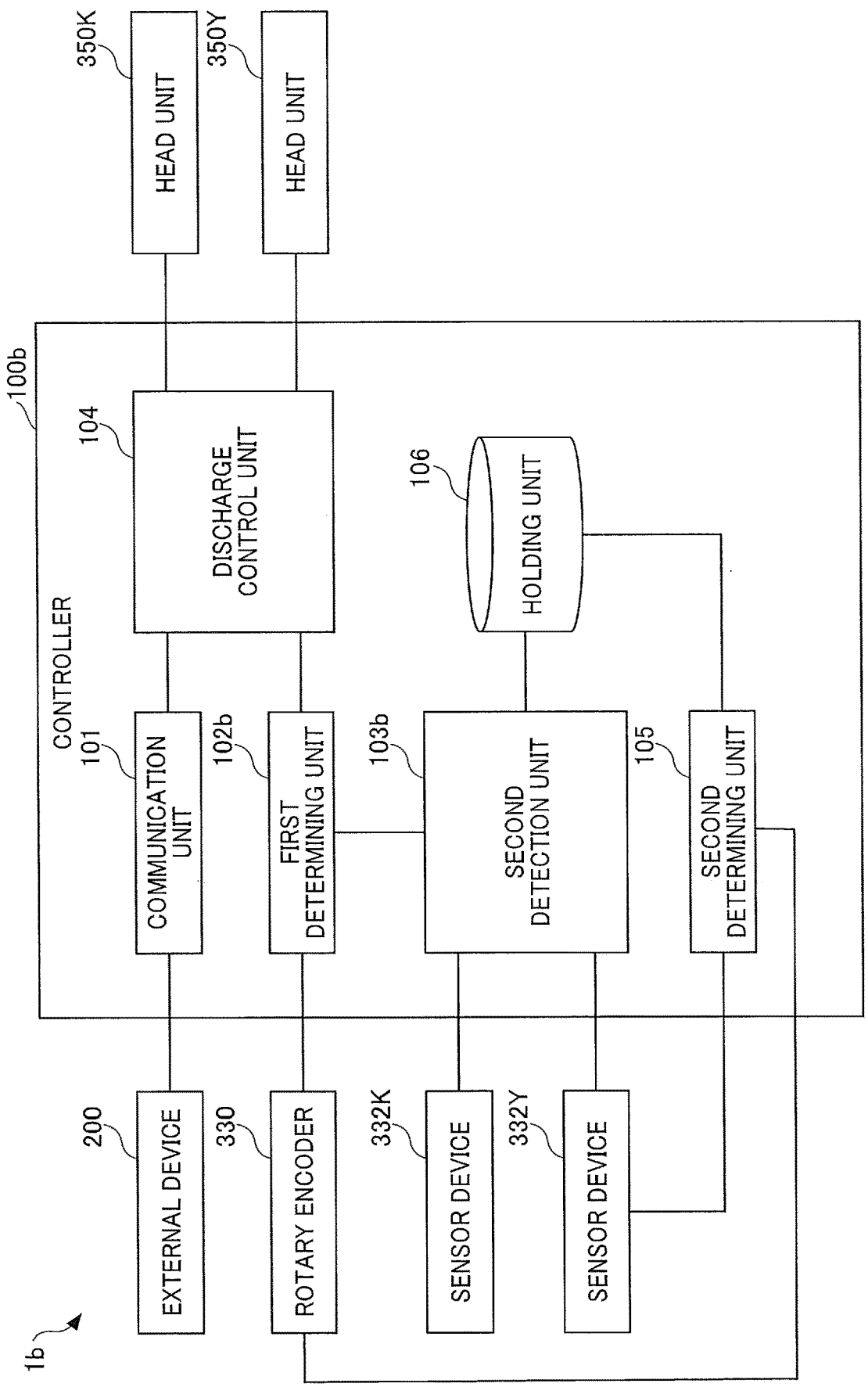
FIG. 9 is a block diagram illustrating a functional configuration of a controller according to a third embodiment.

Next, an image forming apparatus 1b according to a third embodiment will be described. FIG. 9 is a block diagram illustrating an example of a functional configuration of a controller 100b included in the image forming apparatus 1b.

As illustrated in FIG. 9, the controller 100b includes a first determining unit 102b and a second detection unit 103b. Each of the above-described units is a function or means for functioning that is implemented by any of the components illustrated in FIG. 2 operating in response to an instruction from the CPU 301 in accordance with a program read from the ROM 302 into the RAM 303.

The second detection unit 103b changes the processing condition according to at least one of the type of the recording medium such as the continuous sheet P, the tensile force for pulling the recording medium, the interval between ink droplets on the recording medium, or the preliminary discharge result. The processing for detecting a movement amount error ΔD of the recording medium is performed based on the first image and the second image by using the changed processing condition.

Here, the recording medium may expand and contract due to, for example, the application of ink. When the expansion and contraction of the recording medium are different between the first image and the second image, the shape of the background pattern of the continuous sheet P is changed between the first image and the second image. As a result, the cross-correlation calculation may not be accurately performed, and the movement amount error ΔD may not be accurately detected.

Therefore, the expansion and contraction of the pattern in the first image or the second image due to the expansion and contraction of the recording medium is preferably corrected by image processing. Examples of the processing condition include the expansion and contraction rate of image processing for expanding and contracting each of the first image and the second image in a direction corresponding to the moving direction 2.

Examples of the type of recording medium include plain paper, glossy paper, permeable paper, and impermeable paper. The absorption rate (penetration rate) of ink applied to the recording medium differs depending on the type of the recording medium, and the expansion and contraction of the recording medium differs depending on the absorption rate. For this reason, the second detection unit 103b changes the expansion and contraction rate of the image processing according to the type of the recording medium.

The tensile force pulling the recording medium is, for example, a tensile force (tension) applied to the continuous sheet P by the drive roller 321 illustrated in FIG. 1. The expansion and contraction of the continuous sheet P vary with such a tensile force. For this reason, the second detection unit 103b changes the expansion and contraction rate of image processing in accordance with the tensile force.

The interval between adjacent ink droplets on the recording medium is, for example, the interval (distance) between adjacent ink droplets on the recording medium, which is determined by, for example, the resolution of an image formed on the recording medium. As the interval between ink droplets is smaller, the amount of the ink applied to the recording medium increases accordingly, and the moisture absorbed by the recording medium also increases. Since the amount of expansion and contraction differs according to the absorbed moisture, the second detection unit 103b changes the expansion and contraction rate of image processing according to the interval between adjacent ink droplets on the recording medium.

The preliminary discharge result means, for example, a result of trial printing performed before image formation on a recording medium. Since the information of the expansion and contraction rate of the first image or the second image can be obtained from the evaluation of the preliminary discharge result, the second detection unit 103b changes the expansion and contraction rate of the image processing according to the preliminary discharge result.

In addition, the second detection unit 103b can change at least one of the image capturing range of the sensor device 332K or the image capturing range of the sensor device 332Y in accordance with at least one of the type of the recording medium such as the continuous sheet P, the tensile force for pulling the recording medium, the intervals between ink droplets on the recording medium, or the preliminary discharge result.

When the first image and the second image are captured in the same capturing range, the size of the pattern included in the first image and the size of the pattern included in the second image may be different due to the expansion and contraction of the recording medium. Such a difference in the pattern size between the images may disturb the accurate detection of the movement amount error by the cross-correlation operation.

For this reason, the second detection unit 103b controls at least one of the sensor device 332K or the sensor device 332Y to change the image capturing range so that the size of the pattern included in the first image and the size of the pattern included in the second image are substantially equal to each other.

The image capturing range may be changed by changing the zoom magnification of a zoom lens in the sensor device 332K or the sensor device 332Y or by switching a lens using a revolver. At least one of the sensor device 332K or the sensor device 332Y performs image capturing in the changed image capturing range. Thus, the size of the pattern included in the first image and the size of the pattern included in the second image can be set to be substantially equal to each other, and the movement amount error can be accurately detected.

The type of the recording medium, the tensile force for pulling the recording medium, the interval between adjacent ink droplets on the recording medium, and the preliminary discharge result are the same as those described above.

The first determining unit 102b changes the discharge timing of the head unit 350Y in accordance with at least one of the type of recording medium, the tensile force for pulling the recording medium, the interval between adjacent ink droplets on the recording medium, or the preliminary discharge result.

In a case where a recording medium expands or contracts, if ink is discharged at the same timing as in a case where there is no expansion or contraction, ink may not be applied to a desired position of the recording medium. For this reason, the first determining unit 102b changes the ink discharge timing according to the expansion and contraction of the recording medium, to restrain the positional deviation of the ink application. It is more preferable to change the discharge timing by specifying a rate such as 50% or 70% with respect to the expansion and contraction of the recording medium because overcorrection can be restrained.

The type of the recording medium, the tensile force for pulling the recording medium, the interval between adjacent ink droplets on the recording medium, and the preliminary discharge result are the same as those described above.

As described above, in the present embodiment, the processing condition of the second detection unit 103b or the image capturing range of at least one of the sensor device 332K or the sensor device 332Y is changed in accordance with at least one of the type of the recording medium, the tensile force for pulling the recording medium, the interval between adjacent ink droplets on the recording medium, or the preliminary discharge result. Further, the first determining unit 102b changes the ink discharge timing.

Thus, the influence of the movement amount error of the recording medium can be accurately corrected, thus allowing the head unit 350Y to discharge ink at an accurate timing.

Other operational effects are the same as those of the above-described embodiments.

Fourth Embodiment

Figure 10:
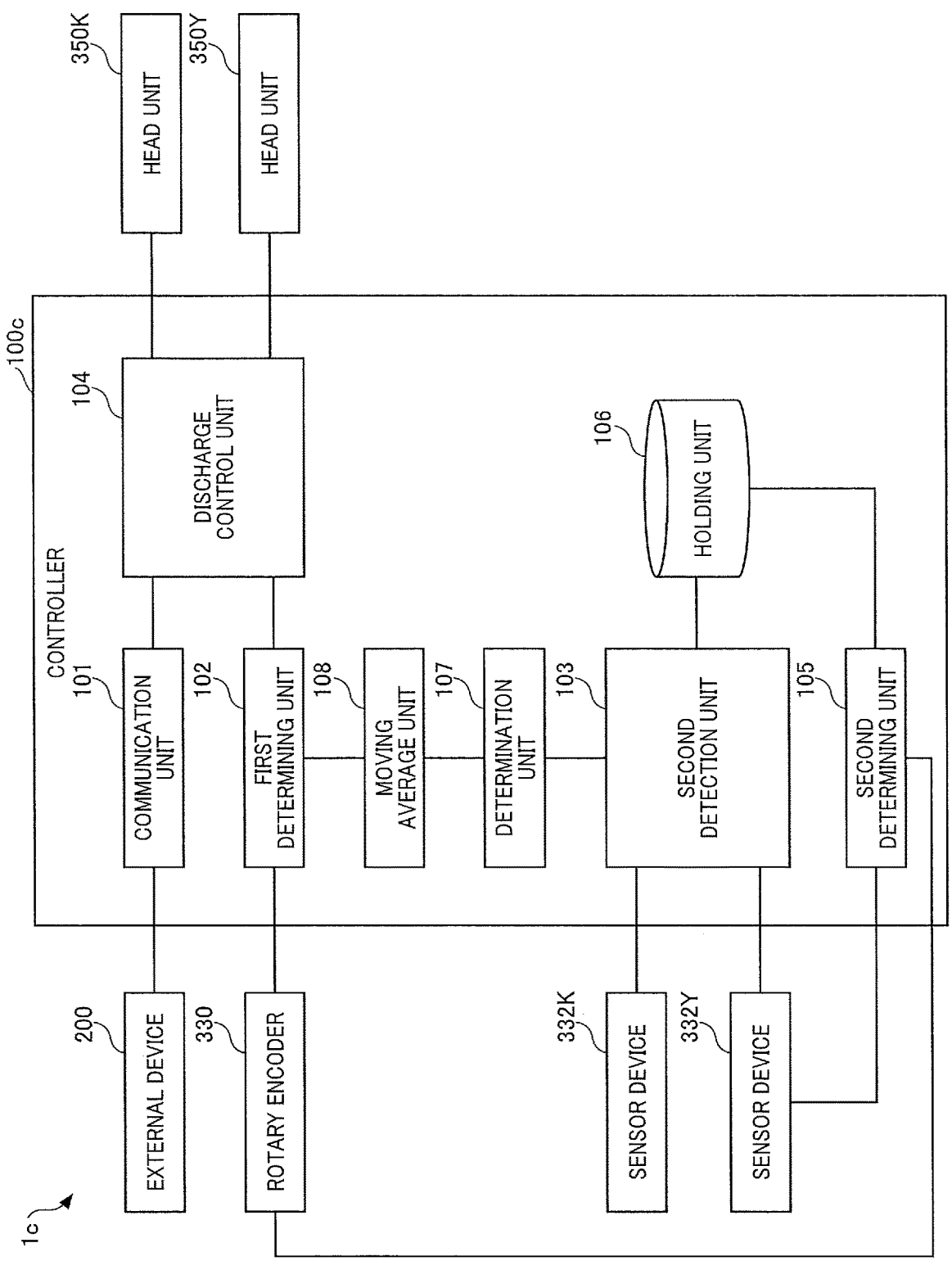
FIG. 10 is a block diagram illustrating a functional configuration of a controller according to a fourth embodiment.

Next, an image forming apparatus 1c according to a fourth embodiment will be described. FIG. 10 is a block diagram illustrating an example of a functional configuration of a controller 100c included in the image forming apparatus 1c.

As illustrated in FIG. 10, the controller 100c includes a determination unit 107 and a moving average unit 108. Each of the above-described units is a function or means for functioning that is implemented by any of the components illustrated in FIG. 2 operating in response to an instruction from the CPU 301 in accordance with a program read from the ROM 302 into the RAM 303.

The first determining unit 102 corrects the movement amount L with the movement amount error ΔD to determine the discharge timing. The movement amount error ΔD is an example of a correction amount by the first determining unit 102.

The determination unit 107 determines at least one of whether the movement amount error ΔD is equal to or greater than a predetermined correction threshold value or whether a period in which the movement amount error ΔD is equal to or greater than the predetermined correction threshold value is equal to or greater than a predetermined period.

The moving average unit 108 performs moving average processing on the movement amount error ΔD in at least one of a case where the movement amount error ΔD is equal to or larger than the predetermined correction threshold or a case where the period in which the movement amount error ΔD is equal to or larger than the predetermined correction threshold is equal to or longer than the predetermined period.

When the movement amount error ΔD is equal to or larger than the predetermined correction threshold value or when the period in which the movement amount error ΔD is equal to or larger than the predetermined correction threshold value is equal to or longer than the predetermined period, it is highly likely that the background pattern of the recording medium has been erroneously detected. Performing moving average processing on the detected movement amount error ΔD can restrain the influence of erroneous detection of the background pattern of the recording medium. Other operational effects are the same as those of the above-described embodiments.

Fifth Embodiment

Figure 11:
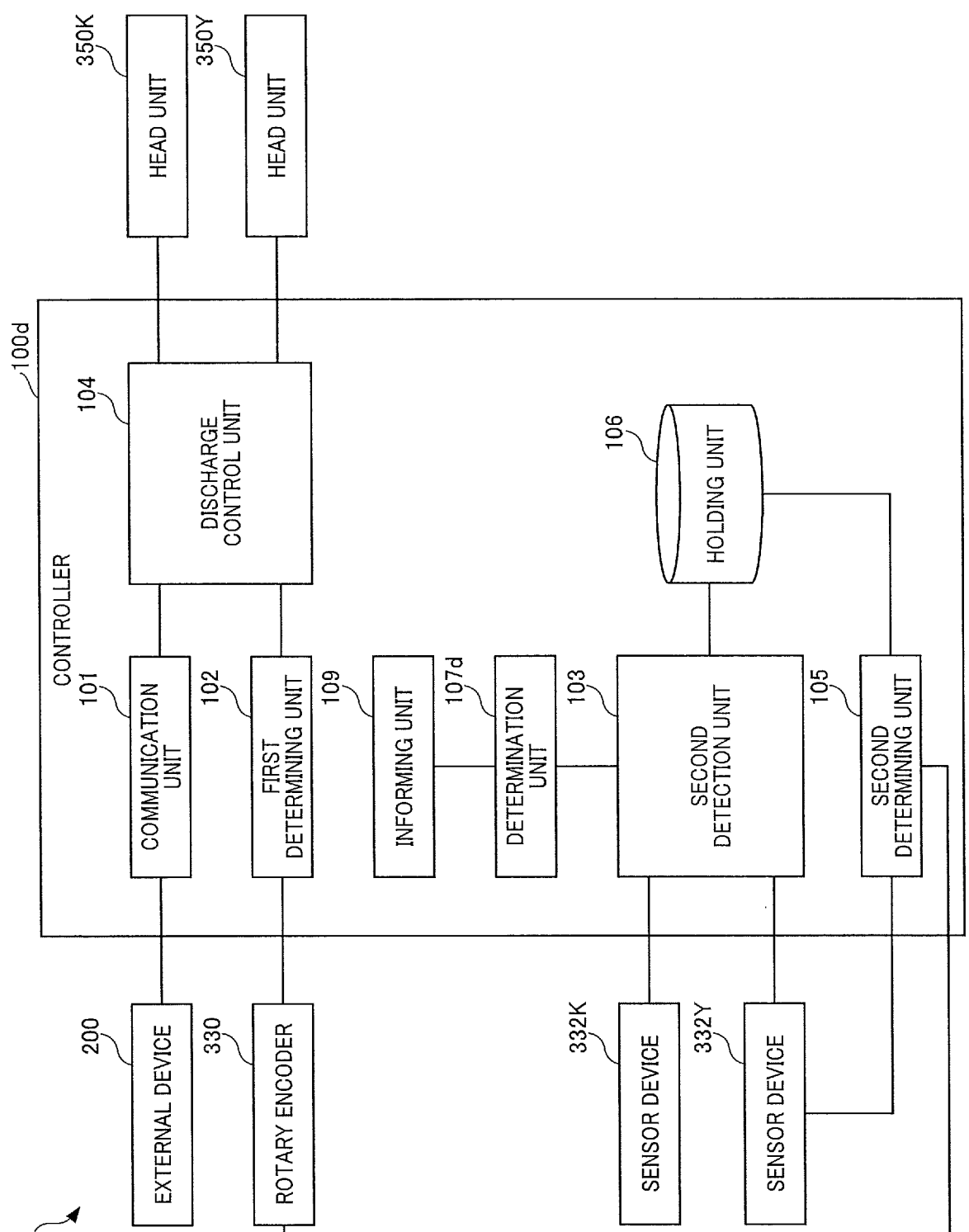
FIG. 11 is a block diagram illustrating a functional configuration of a controller according to a fifth embodiment.

Next, an image forming apparatus 1d according to a fifth embodiment will be described. FIG. 11 is a block diagram illustrating an example of a functional configuration of a controller 100d included in the image forming apparatus 1d.

As illustrated in FIG. 11, the controller 100d includes a determination unit 107d and a notifying unit 109. Each of the above-described units is a function or means for functioning that is implemented by any of the components illustrated in FIG. 2 operating in response to an instruction from the CPU 301 in accordance with a program read from the ROM 302 into the RAM 303.

The determination unit 107d determines at least one of whether the movement amount error ΔD is greater than or equal to a predetermined correction threshold value, whether a period in which the movement amount error ΔD is greater than or equal to the predetermined correction threshold value is greater than or equal to a predetermined period, or whether the brightness of a first image and a second image is less than or equal to a brightness threshold value.

The notifying unit 109 notifies the operator operating the image forming apparatus 1d in at least one of a case where the movement amount error ΔD is greater than or equal to the predetermined correction threshold value, a case where the period in which the movement amount error ΔD is greater than or equal to the predetermined correction threshold value is greater than or equal to the predetermined period, or a case where the brightness of the first image and the second image is less than or equal to the brightness threshold value. Examples of the notification include display of a predetermined message on an operation panel on the image forming apparatus 1d, generation of a warning sound, and transmission of an e-mail including a predetermined message.

The brightness of the first image and the second image is a determination item for detecting contamination of a lens included in the sensor device 332K or the sensor device 332Y because the first image and the second image may become dark due to contamination of the lens with ink.

Notifying the operator who operates the image forming apparatus 1d can prompt the operator to deal with the abnormality of the image forming apparatus 1d.

Sixth Embodiment

Figure 12:
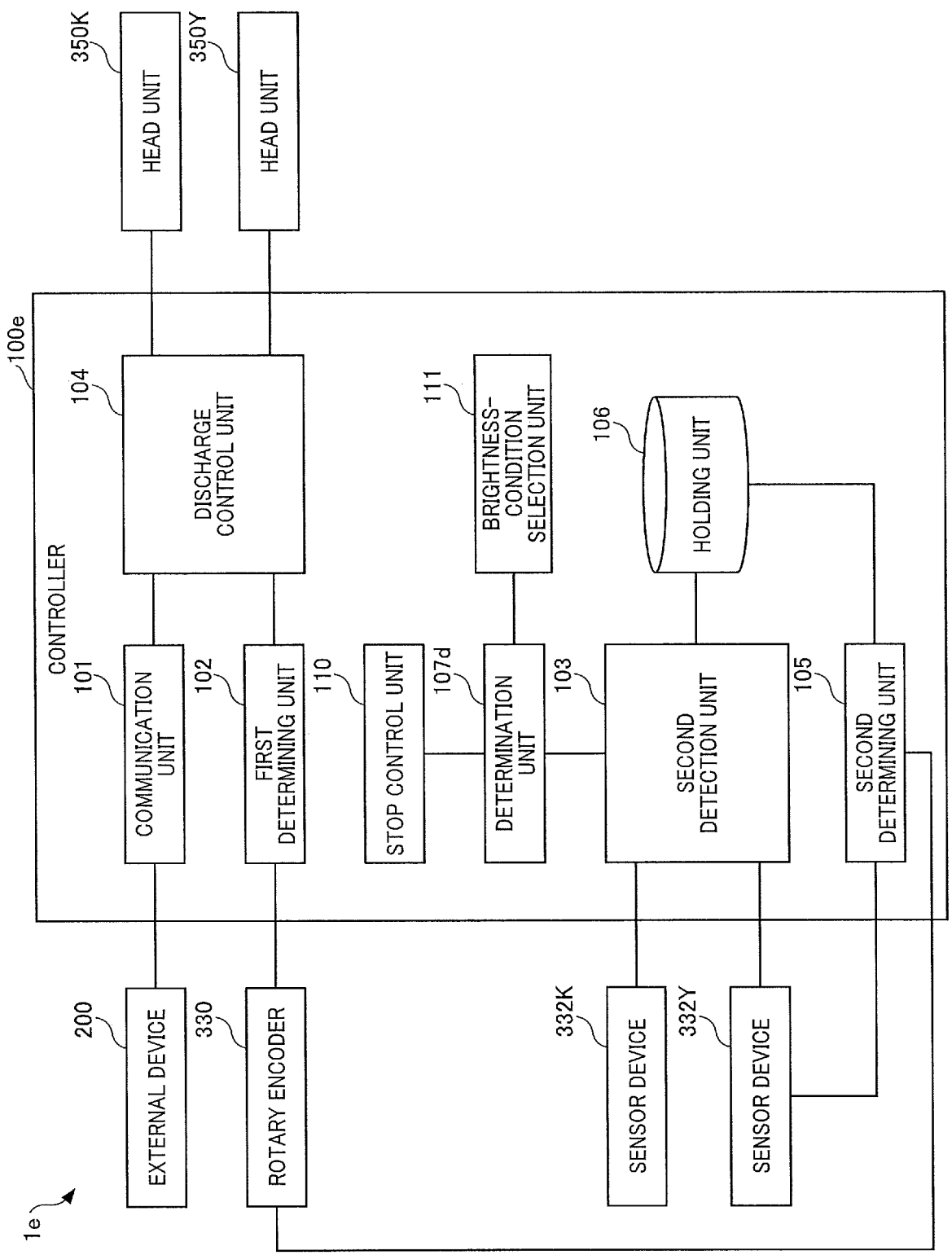
FIG. 12 is a block diagram illustrating a functional configuration of a controller according to a sixth embodiment.

Next, an image forming apparatus 1e according to a sixth embodiment will be described. FIG. 12 is a block diagram illustrating an example of a functional configuration of a controller 100e included in the image forming apparatus 1e.

As illustrated in FIG. 12, the controller 100e includes a stop control unit 110 and a brightness-condition selection unit 111. Each of the above-described units is a function or means for functioning that is implemented by any of the components illustrated in FIG. 2 operating in response to an instruction from the CPU 301 in accordance with a program read from the ROM 302 into the RAM 303.

The stop control unit 110 stops the image forming apparatus 1e in at least one of a case where the movement amount error ΔD is greater than or equal to a predetermined correction threshold, a case where a period in which the movement amount error ΔD is equal to or greater than the predetermined correction threshold is equal to or greater than a predetermined period, or a case where the brightness of the first image and the second image is equal to or less than a brightness threshold. This stop is, for example, an emergency stop.

The brightness-condition selection unit 111 has a function of selecting the brightness threshold value in accordance with an operation by, for example, an operator of the image forming apparatus 1e. Since the appropriate value of the brightness threshold varies with the brightness around the image forming apparatus 1e, it is preferable that the brightness threshold can be appropriately selected by the operator.

When an abnormality occurs, the image forming apparatus 1e is urgently stopped as described above, thus reducing

Seventh Embodiment

Figure 13:
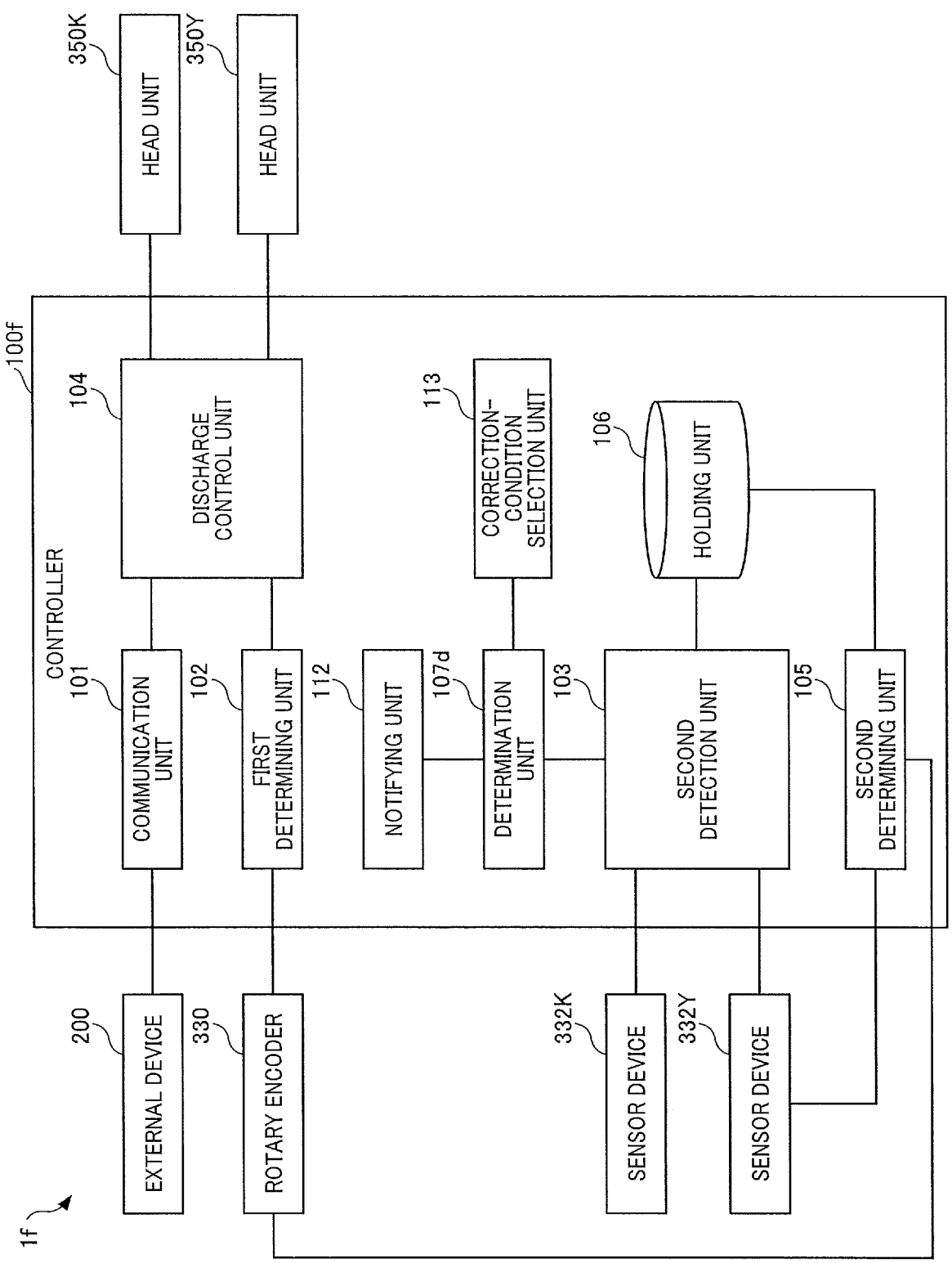
FIG. 13 is a block diagram illustrating a functional configuration of a controller according to a seventh embodiment.

Next, an image forming apparatus 1f according to a seventh embodiment will be described. FIG. 13 is a block diagram illustrating an example of a functional configuration of a controller 100f included in the image forming apparatus 1f.

As illustrated in FIG. 13, the controller 100f includes a notifying unit 112 and a correction-condition selection unit 113. Each of the above-described units is a function or means for functioning that is implemented by any of the components illustrated in FIG. 2 operating in response to an instruction from the CPU 301 in accordance with a program read from the ROM 302 into the RAM 303.

The image forming apparatus 1f forms images of a plurality of pages on a recording medium. For example, images of pages of a predetermined size are formed on the continuous sheet P at predetermined intervals.

The notifying unit 112 has a function of notifying information indicating that a page is equal to or larger than a correction threshold value, in at least one of a case where the movement amount error ΔD is equal to or larger than a predetermined correction threshold value or a case where a period in which the movement amount error ΔD is equal to or larger than the predetermined correction threshold value is equal to or longer than a predetermined period. For example, the information may be displayed on an operation panel on the image forming apparatus 1f, or an e-mail including the information may be transmitted.

The correction-condition selection unit 113 has a function of selecting a correction threshold value in accordance with an operation by, for example, an operator of the image forming apparatus 1f. Since an appropriate value of the correction threshold varies with an operation condition of the image forming apparatus 1f, it is preferable that the correction threshold can be appropriately selected by, for example, the operator.

Such a configuration allows the operator to know a page that may include an abnormality in image formation, and facilitates the operator to perform a process of removing an abnormal page after the image formation.

Eighth Embodiment

Figure 14:
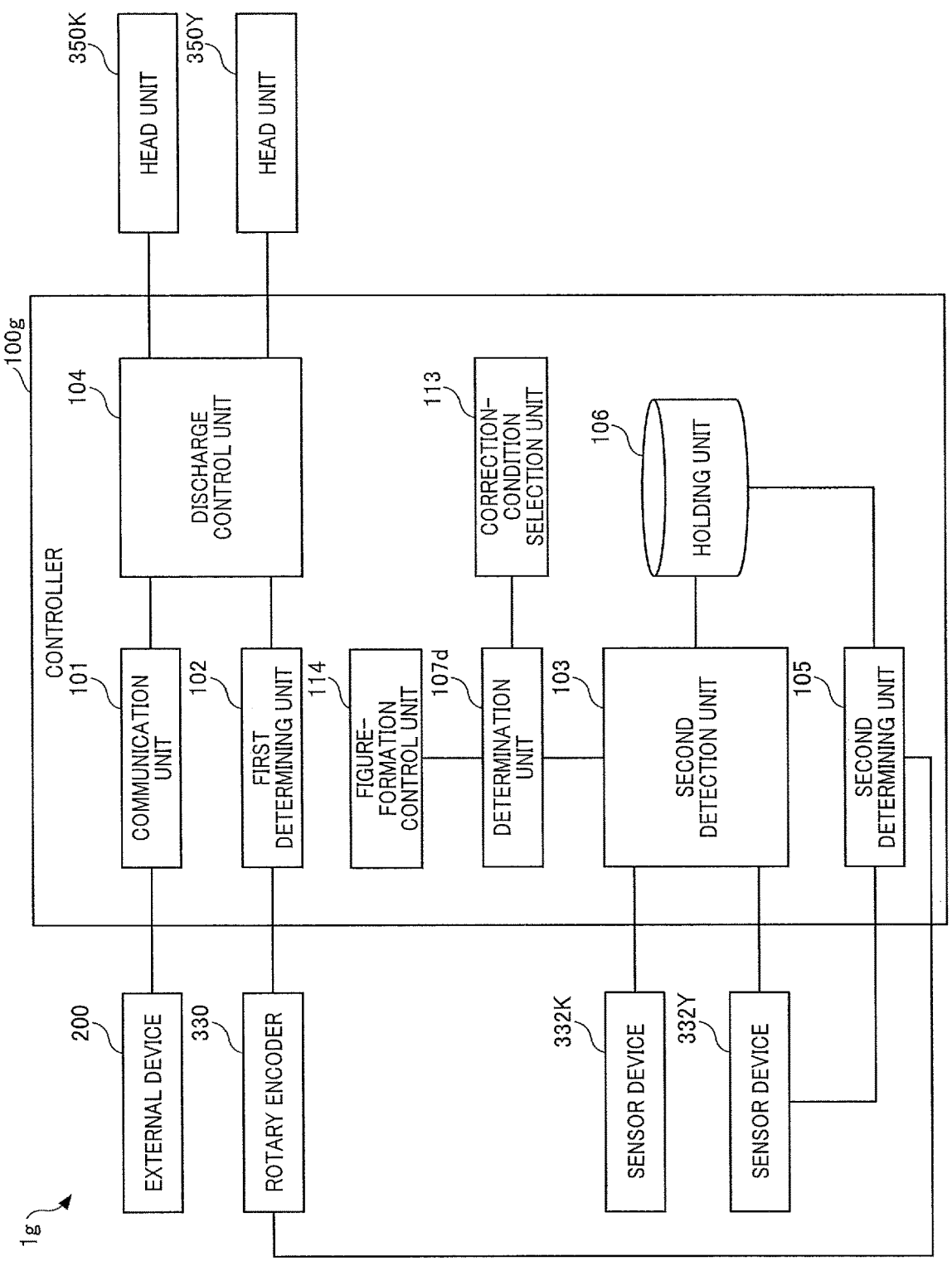
FIG. 14 is a block diagram illustrating a functional configuration of a controller according to an eighth embodiment.

Next, an image forming apparatus 1g according to an eighth embodiment will be described. FIG. 14 is a block diagram illustrating an example of a functional configuration of a controller 100g included in the image forming apparatus 1g.

As illustrated in FIG. 14, the controller 100g includes a figure-formation control unit 114. The figure-formation control unit 114 is a function or means that functions as a result of any of the components illustrated in FIG. 2 operating in response to an instruction from the CPU 301 in accordance with a program read from the ROM 302 into the RAM 303.

the figure-formation control unit 114 has a function of forming a predetermined figure on a page of a continuous sheet P, in at least one of a case where the movement amount error ΔD in the page is equal to or greater than a predetermined correction threshold value or a case where a period in which the movement amount error ΔD in the page is equal to or greater than the predetermined correction threshold value is equal to or greater than a predetermined period. The predetermined figure is, for example, a mark indicating an abnormality.

Such a configuration facilitates the operator to visually recognize a page that may include an abnormality in image formation, and also facilitates the operator to perform a process of removing an abnormal page after the image formation.

Although some embodiments have been described above, embodiments of the present disclosure are not limited to the above-described embodiments specifically disclosed, and various modifications and changes can be made without departing from the scope of the appended claims.

In the above-described embodiments, the sensor device 332K and the sensor device 332Y irradiate the continuous sheet P with incoherent light to capture an image of the background pattern of the recording medium. For example, the first image and the second image may be captured by irradiating a laser beam and capturing a speckle pattern generated by scattered light on the continuous sheet P.

Alternatively, a predetermined mark may be formed on the continuous sheet P in advance, and captured images of the mark may be used as the first image and the second image. With such configurations, the same or similar operational effects can be obtained as in the case of capturing the background pattern of the recording medium.

In addition, when the cross-correlation calculation between the first image and the second image is performed, not only the deviation of the first image and the second image in the moving direction 2 but also the deviation between the first image and the second image in the direction orthogonal to the moving direction 2 can be detected.

By using this, when a recording medium such as the continuous sheet P is shifted in the direction orthogonal to the moving direction 2, the shift amount can be detected by the cross-correlation calculation. Moving the head units 350K, 350Y, 350M, and 350C in accordance with the detected shift amount, the influence of the shift of the recording medium in the direction orthogonal to the moving direction 2 can be corrected, thus allowing an image to be formed at a correct position on the recording medium.

For the movement of the head units 350K, 350Y, 350M, and 350C in the direction orthogonal to the moving direction 2, for example, actuators disposed in the head units 350K, 350Y, 350M, and 350C can be used.

Embodiments also include a liquid discharge method. According to an embodiment of the present disclosure, there is provided a liquid discharge method to be executed by a liquid discharge apparatus that discharges liquid onto a recording medium moved in a predetermined moving direction. The liquid discharge method includes: detecting a first movement amount of the recording medium by a first detection unit; discharging liquid onto the recording medium by a first liquid discharge unit downstream from the first detection unit in the moving direction; capturing a first image of the recording medium in a predetermined image capturing range by a first image capturing unit between the first detection unit and the first liquid discharge unit; capturing a second image of the recording medium in the predetermined image capturing range by a second image capturing unit between the first detection unit and the first image capturing unit; detecting a second movement amount of the recording medium based on the first image and the second image; determining a discharge timing of the first liquid discharge unit based on the first movement amount and the second movement amount; and determining a discharge timing of the second image capturing unit based on the first movement amount and the second movement amount. Such a liquid discharge method can provide operational effects equivalent to those of the above-described liquid discharge apparatus.

Embodiments also include a storage medium storing computer-readable program instructions and a computer-readable program product. For example, according to an embodiment of the present disclosure, there is provided a non-transitory storage medium storing computer-readable program code. The program code causes a computer to execute a process in a liquid discharge apparatus that discharges liquid onto a recording medium moved in a predetermined moving direction. The process includes: detecting, with a first detection unit, a first movement amount of the recording medium; discharging, with a first liquid discharge unit, liquid onto the recording medium in an area downstream from the first detection unit in the moving direction; capturing, with a first image capturing unit, a first image of the recording medium in a predetermined image capturing range between the first detection unit and the first liquid discharge unit; capturing, with a second image capturing unit, a second image of the recording medium in the predetermined image capturing range between the first detection unit and the first image capturing unit; detecting a second movement amount of the recording medium based on the first image and the second image; determining a discharge timing of the first liquid discharge unit based on the first movement amount and the second movement amount; and determining a discharge timing of the second image capturing unit based on the first movement amount and the second movement amount. A storage medium or a computer-readable program product including such program code can provide operational effects equivalent to those of the above-described liquid discharge apparatus.

In addition, the numbers such as ordinal numbers and quantities used above are all examples for specifically describing the technology of the present invention, and embodiments of the present invention are not limited to the exemplified numbers. In addition, the above-describe connections among the components are examples for specifically describing the technology of the present invention, and connections for implementing functions of the present invention are not limited to the above-described examples.

The functions of the above-described embodiments may be implemented by one or a plurality of processing circuits. Here, the processing circuit or circuitry in the present specification includes a programmed processor to execute each function by software, such as a processor implemented by an electronic circuit, and devices, such as an application specific integrated circuit (ASIC), a digital signal processor (DSP), and a field programmable gate array (FPGA), and conventional circuit modules arranged to perform the recited functions.

What is claimed is:

1. A liquid discharge apparatus configured to discharge liquid onto a recording medium moved in a moving direction, the liquid discharge apparatus comprising:
    a first detector configured to detect a first movement amount of the recording medium;
    a first liquid discharge unit including a head disposed downstream of the first detector in the moving direction, the first liquid discharge unit configured to discharge liquid onto the recording medium;
    a first image capturing unit including a sensor disposed between the first detector and the first liquid discharge unit, the first image capturing unit configured to capture a first image of the recording medium in an image capturing range;
    a second image capturing unit including a sensor disposed between the first liquid discharge unit and the first image capturing unit, the second image capturing unit configured to capture a second image of the recording medium in the image capturing range; and
    circuitry configured to
        detect a second movement amount of the recording medium based on the first image and the second image,
        determine a discharge timing of the first liquid discharge unit based on the first movement amount and the second movement amount, and
        determine an image capturing timing of the second image capturing unit during image formation on the recording medium based on the first movement amount and the second movement amount.

2. The liquid discharge apparatus according to claim 1, wherein the image capturing timing is equal to the discharge timing.

3. The liquid discharge apparatus according to claim 1, wherein the circuitry is further configured to
    hold a previously-detected second movement amount from among second movement amounts periodically detected by the second detection unit, and
    determine a current image capturing timing of the second image capturing unit based on the first movement amount and the previously-detected second movement amount.

4. The liquid discharge apparatus according to claim 1, further comprising a second liquid discharge unit including a head disposed between the first image capturing unit and the second image capturing unit, the second liquid discharge unit configured to discharge liquid onto the recording medium,
    wherein the circuitry is further configured to determine the discharge timing of the first liquid discharge unit with respect to the second liquid discharge unit.

5. The liquid discharge apparatus according to claim 1, wherein the circuitry is further configured to change a processing condition in accordance with at least one of a type of the recording medium, a tensile force pulling the recording medium, an interval between adjacent liquid droplets on the recording medium, or a preliminary discharge result.

6. The liquid discharge apparatus according to claim 1, wherein at least one of the first image capturing unit or the second image capturing unit is configured to change the image capturing range in accordance with at least one of a type of the recording medium, a tensile force pulling the recording medium, an interval between adjacent liquid droplets on the recording medium, or a preliminary discharge result.

7. The liquid discharge apparatus according to claim 1, wherein the circuitry is further configured to change the discharge timing of the first liquid discharge unit in accordance with at least one of a type of the recording medium, a tensile force pulling the recording medium, an interval between adjacent liquid droplets on the recording medium, or a preliminary discharge result.

8. The liquid discharge apparatus according to claim 1, wherein the circuitry is further configured to
    calculate a correction amount for the first movement amount to determine the discharge timing of the first liquid discharge unit, and perform moving average processing on the correction amount in at least one of a case where the correction amount is equal to or greater than a correction threshold value or a case where the correction amount is equal to or greater than the correction threshold value for a predetermined period or longer.

9. The liquid discharge apparatus according to claim 1, wherein the circuitry is further configured to
calculate a correction amount for the first movement amount to determine the discharge timing of the first liquid discharge unit, and
notify an operator who operates the liquid discharge apparatus, in at least one of a case where the correction amount is equal to or greater than a correction threshold valuer, a case where the correction amount is equal to or greater than the correction threshold value for a predetermined period or longer, or a case where a brightness of at least one the first image or the second image is equal to or less than a brightness threshold value.

10. The liquid discharge apparatus according to claim 9, wherein the circuitry is further configured to select the brightness threshold value.

11. The liquid discharge apparatus according to claim 1, wherein the circuitry is further configured to
calculate a correction amount for the first movement amount to determine the discharge timing of the first liquid discharge unit, and
stop the liquid discharge apparatus in at least one of a case where the correction amount is equal to or greater than a correction threshold value, a case where the correction amount is equal to or greater than the correction threshold value for a predetermined period or longer, or a case where a brightness of at least one of the first image or the second image is equal to or less than a brightness threshold value.

12. The liquid discharge apparatus according to claim 1, wherein the liquid discharge apparatus is configured to discharge liquid onto a plurality of pages of the recording medium, and
wherein the circuitry is further configured to
calculate a correction amount for a predetermined discharge timing to determine a discharge timing of the first liquid discharge unit, and
notify information indicating a page in which the correction amount is equal to or greater than a correction threshold value, in at least one of a case where the correction amount is equal to or greater than the correction threshold value or a case where the correction amount is equal to or greater than the correction threshold value for a predetermined period or longer.

13. The liquid discharge apparatus according to claim 12, wherein the circuitry is further configured to select at least one of the correction threshold value and the predetermined period.

14. The liquid discharge apparatus according to claim 1, wherein the liquid discharge apparatus is configured to discharge liquid onto a plurality of pages of the recording medium, and
wherein the circuitry is further configured to
calculate a correction amount for a predetermined discharge timing to determine a discharge timing of the first liquid discharge unit, and
form a predetermined figure on a page in which the correction amount is equal to or greater than a correction threshold value, in at least one of a case where the correction amount is equal to or greater than the correction threshold value or a case where the correction amount is equal to or greater than the correction threshold value for a predetermined period or longer.

15. The liquid discharge apparatus according to claim 1, wherein
the circuitry is further configured to determine the image capturing timing of the second image capturing unit based on the first movement amount that is a movement amount of the recording medium with respect to the first detector and the second movement amount that is a movement amount error of the second image with respect to the first image.

16. A liquid discharge method to be executed by a liquid discharge apparatus that discharges liquid onto a recording medium moved in a moving direction, the liquid discharge method comprising:
detecting, by a first detector, a first movement amount of the recording medium;
discharging liquid onto the recording medium by a first liquid discharge unit including a head disposed downstream of the first detector in the moving direction;
capturing a first image of the recording medium in an image capturing range by a first image capturing unit including a sensor disposed between the first detector and the first liquid discharge unit;
capturing a second image of the recording medium in the image capturing range by a second image capturing unit including a sensor disposed between the first liquid discharge unit and the first image capturing unit;
detecting a second movement amount of the recording medium based on the first image and the second image;
determining a discharge timing of the first liquid discharge unit based on the first movement amount and the second movement amount; and
determining an image capturing timing of the second image capturing unit during image formation on the recording medium based on the first movement amount and the second movement amount.

17. A non-transitory computer-readable storage medium storing program code that, when executed by a computer, causes the computer to perform a process in a liquid discharge apparatus that discharges liquid onto a recording medium moved in a moving direction, the process comprising:
detecting, by a first detector, a first movement amount of the recording medium;
discharging liquid onto the recording medium by a first liquid discharge unit including a head disposed downstream of the first detector in the moving direction;
capturing a first image of the recording medium in an image capturing range by a first image capturing unit including a sensor disposed between the first detector and the first liquid discharge unit;
capturing a second image of the recording medium in the image capturing range by a second image capturing unit including a sensor disposed between the first liquid discharge unit and the first image capturing unit;
detecting a second movement amount of the recording medium based on the first image and the second image;
determining a discharge timing of the first liquid discharge unit based on the first movement amount and the second movement amount; and determining an image capturing timing of the second image capturing unit during image formation on the recording medium based on the first movement amount and the second movement amount.

* * * * *